United States Patent [19]
Yoo

[11] Patent Number: 5,904,362
[45] Date of Patent: May 18, 1999

[54] FORWARD-DRIVE APPARATUS FOR A BICYCLE

[75] Inventor: Mun-Su Yoo, Chung Cheong Buk-do, Rep. of Korea

[73] Assignee: World Industry Co., Ltd., Chungcheongbuk-do, Rep. of Korea

[21] Appl. No.: 08/837,166

[22] Filed: Apr. 14, 1997

Related U.S. Application Data

[62] Division of application No. 08/490,388, Jun. 14, 1995, abandoned.

[30] Foreign Application Priority Data

Jun. 14, 1995 [KR] Rep. of Korea ............ 94-13391

[51] Int. Cl.$^6$ .................................................. B62M 9/04
[52] U.S. Cl. ................................ 280/237; 280/260
[58] Field of Search ............................ 280/236, 237, 280/238, 259, 260

[56] References Cited

U.S. PATENT DOCUMENTS

| | | | |
|---|---|---|---|
| 504,168 | 8/1893 | Morris | 280/236 |
| 587,787 | 8/1897 | Buckler | 280/238 |
| 603,326 | 5/1898 | Feingold | 280/237 |
| 4,059,028 | 11/1977 | Schulz et al. | 475/297 |
| 4,727,965 | 3/1988 | Zach et al. | 192/6 A |
| 4,758,013 | 7/1988 | Agrillo | 280/250.1 |
| 5,394,764 | 3/1995 | Fini, Jr. | 74/378 |
| 5,435,583 | 7/1995 | Foster, Jr. | 280/237 |

FOREIGN PATENT DOCUMENTS

| | | |
|---|---|---|
| 745409 | 5/1933 | France . |
| 91-3786 | 6/1991 | Rep. of Korea . |
| 92-1405 | 2/1992 | Rep. of Korea . |

*Primary Examiner*—Kevin Hurley
*Attorney, Agent, or Firm*—Lowe Hauptman Gopstein Gilman & Berner

[57] ABSTRACT

A forward-drive apparatus for a bicycle comprises a drive transferring portion 40 including a pedal 20 fixed to a pedal shaft 22 of a bicycle and for transferring the drive force to a drive sprocket 30 connected by means of a chain to a rear wheel; a drive switching portion 50 for enabling the drive force generated from the drive transferring portion 40 to rotate the rear wheel in a forward or idle state; and a drive coupling portion 60 for enabling the forward or idle rotation of the drive sprocket 30 according to the operation of the drive switching portion 50 and for working the bicycle in a forward or idle rotation according to the selection of a lever during the back-pedaling of the bicycle, thereby relieving user's fatigues preventing the loss of the physical energy and enabling the well-muscled movement of legs in every-day life.

4 Claims, 20 Drawing Sheets

FORWARD-DRIVE APPARATUS FOR A BICYCLE

This application is a division of application Ser. No. 08/490,388 filed Jun. 14, 1995 now abandoned.

BACKGROUND OF THE INVENTION

The invention is related to providing a forward-drive apparatus for a bicycle for working the bicycle in a forward or idle rotation according to the selection of a lever during the back-pedaling of the bicycle, thereby relieving user's fatigue, preventing the loss of the physical energy and enabling the well-muscled movement of legs in every-day life.

PRIOR ART

Generally, a bicycle has a forward drive apparatus for transferring the pedaling force to a wheel and comprising a drive sprocket driven by the rotating of a pedal axle and a driven sprocket connected by means of a chain to the drive sprocket thereby to transfer the rotating force of the drive sprocket to a rear wheel.

The forward drive apparatus is configured so that the drive sprocket is rotated, so called the forward rotation, by the user's forward pedaling and then the driven sprocket is forward-rotated through the chain while then a rear axle bobbin coupled through one-direction clutch with the driven sprocket turns a rear wheel thereby to work the bicycle in a forward movement. On the contrary during the user's back-pedaling the drive sprocket is rotated, so called the reverse-rotation, and the driven sprocket is reverse-rotated through the chain. At that time, the bobbin is idled with the one-direction clutch, while the driving force of the drive sprocket is not transferred to the rear wheel, and the propelling force of the bicycle is lost.

But, due to it that the forward drive apparatus forces the bicycle to be worked only in the forward movement during the normal pedaling, a driver easily gets feeling his leg's fatigue during the traveling of a sloping road or the long-hours of distance. The driver rotates the pedals in a reverse direction so as to get over the fatigue by himself, consciously or unconsciously, during the traveling. While the one-direction clutch cause the rear wheel to be idled, thereby falling down the propelling force of the bicycle. Herein, it is noted that the forward drive apparatus has a defect to cause the propelling force loss of the bicycle.

Korean Utility-Model Publication No. 92-1405 concerns for working the bicycle in a forward movement with the user's pedaling or back-pedaling, in which a chain gear in front of a known small chain gear and a plain gear having a larger diameter are mounted on the same axis, and a plain gear of a small diameter connected to the known small chain gear is connected to the large plain gear, whereby the small chain gear is operated during the pedaling to work the bicycle in a forward movement, and also the small chain gear, the large plain gear and the small plain gear are operated during the back-pedaling to work the bicycle in a forward movement.

The reverse-drive forward moving apparatus has disadvantages in that the separate chain gear, the small plain gear and the large plain gear are mounted to be exposed to the outside, whereby these parts requests the separate installing space and increases the total weight of the bicycle. Further, the bicycle can not offers the idle rotation with respect to a rear wheel during the back-pedaling. It gives the fatigue feeling to users during the long time of traveling due to the absence of the idle rotation.

The other prior art is described in Korean Utility-Model Publication No. 91-3786 which relates to a reverse-drive forward moving apparatus for a bicycle. The reverse-drive forward moving apparatus is configured so that a ring gear and a drive gear are mounted on a main shaft of a spline wheel to which pedals are fixed, and a separate gear on the base of the main shaft is engaged with the ring gear and the drive gear, whereby the pedaling or back-pedaling forces the spline wheel to be rotated in a forward direction. The reverse-drive forward moving apparatus miniaturizes its parts and decreases the number of its parts over the previous reverse-drive forward moving apparatus, resulting in reducing the total weight of the bicycle But, it also has a disadvantage in that the users easily gets feeling the fatigue during the long time of traveling due to the absence of the idle rotation.

In order to resolve these disadvantages and defects, the object of the invention is to provide a forward-drive apparatus for a bicycle comprising a single unit of a drive transferring portion, a drive switching portion and a drive coupling portion to which the driving force of the pedal shaft is transferred, thereby minimizing the total weight of the bicycle, forward-moving the bicycle during the pedaling or the back-pedaling according to the selection of users, switching the forward-moving into the idle-rotating of a rear wheel according to the selection of the users It gives the relatively wider selection of traveling to users and relieves the fatigue feeling during the long time of traveling.

SUMMARY OF THE INVENTION

Accordingly, a first embodiment of the invention concerns a forward-drive apparatus for a bicycle comprising a drive transferring portion fixed to a pedal shaft of a bicycle and for transferring the drive force to a drive sprocket connected by means of a chain to a rear wheel; a drive switching portion for enabling the drive force generated from the drive transferring portion to perform the forward or idle rotation of the rear wheel; and a drive coupling portion for enabling the forward or idle rotation of the drive sprocket according to the operation of the drive switching portion.

A second embodiment of the invention relates to a forward-drive apparatus for a bicycle comprising a drive transferring portion provided with a rotating wheel fixed to a pedal shaft of a bicycle to be rotated by the pedaling and a first bevel gear, and for transferring the drive force to a drive sprocket connected by means of a chain to a rear wheel; a drive switching portion provided with rachet tooth portion formed around the outside of the drive transferring portion and a ratchet cylinder with a second bevel gear being formed thereon, which are connected to the rotation wheel and the first bevel gear, and for enabling the drive force generated from the drive transferring portion to perform the forward or idle rotation of a rear wheel; and a drive coupling portion engaged with a second bevel gear of the ratchet cylinder of the drive switching portion and a third bevel gear and including a switching stopper for rotating or stopping the ratchet cylinder, and for enabling the forward or idle rotation of the drive sprocket according to the operation of the drive switching portion.

A third embodiment of the invention discloses a forward-drive apparatus for a bicycle comprising a drive transferring portion provided with a drive sprocket fixed to a pedal shaft of a bicycle and a driven sprocket connected by/means of a chain to the drive sprockets which is mounted on a rotating wheel rotatably fixed to a rear shaft, and for transferring the drive force of the driven sprocket to a rear wheel; a drive switching portion for transferring the drive force from the ratchet wheel of the drive transferring portion to the ratchet cylinder to perform the forward or idle rotation or the stopping switching of the rear wheel; and a drive coupling portion for enabling the forward or idle rotation of the rear wheel according to the operation of the drive switching portion.

A fourth embodiment of the invention teaches a forward-drive apparatus for a bicycle comprising a drive transferring portion fixed to a pedal shaft of a bicycle and for transferring the operating force of the pedal in a forward or reverse direction to a rear wheel; a drive switching portion for switching the drive force generated from the drive transferring portion into the forward, reverse or idle rotation; a torque maintaining portion for maintain the forward or idle rotation of the pedal shaft according to the operation of the drive switching portion; and a drive coupling portion elastically engaged with the torque maintaining portion for transferring the drive force to the drive sprocket.

A fifth embodiment of the invention is to provide a forward-drive apparatus for a bicycle comprising a drive transferring portion fixed to a pedal shaft of a bicycle and for transferring the operating force of the pedal in a forward or reverse direction to a rear wheel; a torque maintaining portion elastically engaged with the drive transferring portion; a drive switching portion for switching the drive force transferred from the torque maintain portion into the forwards reverse or idle rotation; and a drive coupling portion for enabling the forward or idle rotation of the drive sprocket according to the operation of the drive switching portion.

A sixth embodiment of the invention is related to providing a forward-drive apparatus for a bicycle comprising a drive transferring portion reciprocated on a pedal shaft of a bicycle; a drive switching portion including a first bevel gears a second bevel gear and a third bevel gear for switching the drive force transferred from the drive transferring portion into the forward or idle rotation; and a drive coupling portion for transferring the switched drive force from the drive switching portion to the drive sprocket.

BRIEF DESCRIPTION OF THE DRAWINGS

The invention will be described in detail with reference to the accompanying drawings, in which.

DETAILED DESCRIPTION OF THE INVENTION

Figure 1:
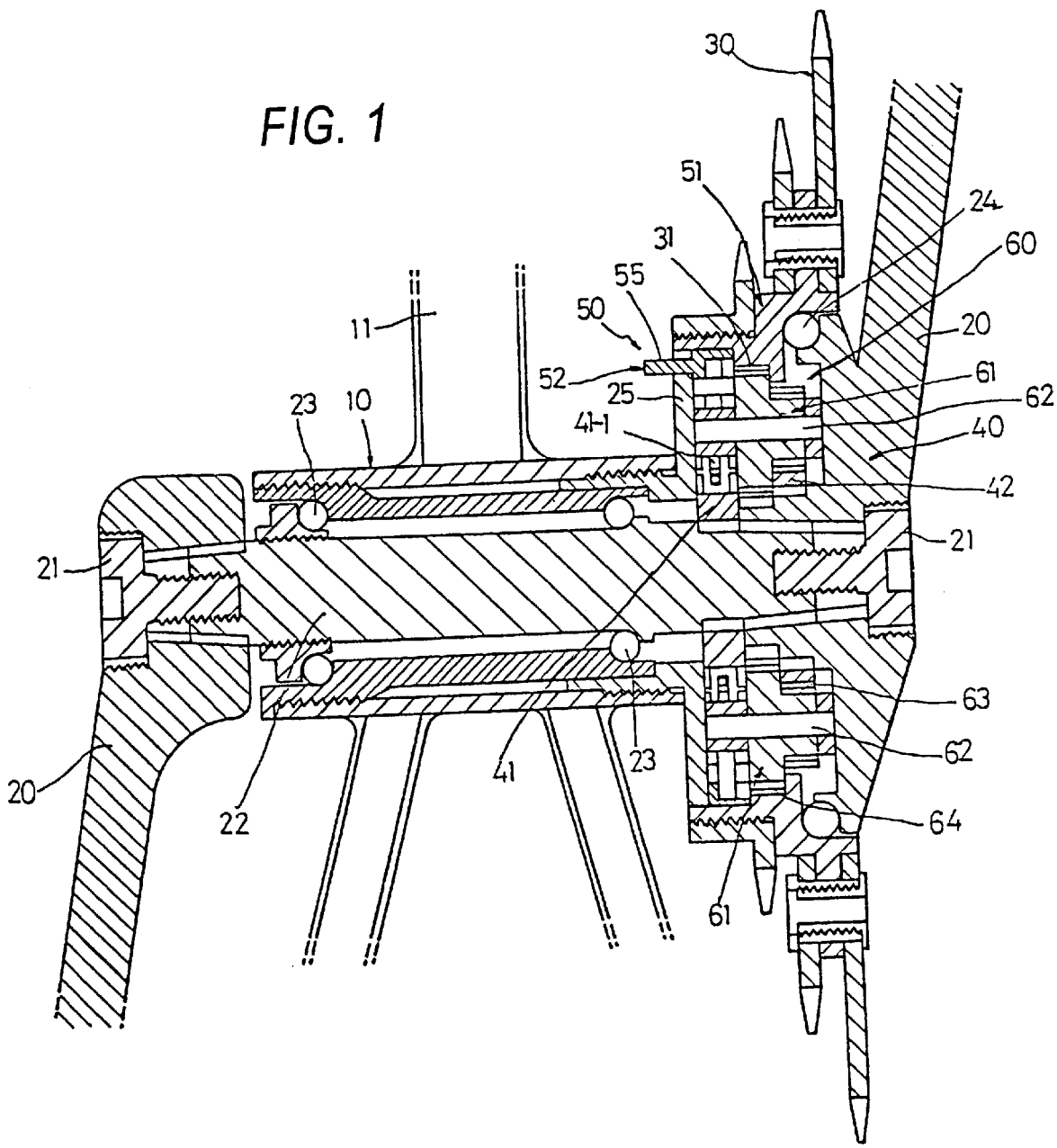
FIG. 1 is a cross-sectional view illustrating a first embodiment of a forward-drive apparatus for a bicycle according to the invention.

According to a first embodiment of the invention, as shown in FIG. 1, a forward-drive apparatus for a bicycle comprises a drive transferring portion 40 including a pedal 20 rotatably fixed by means of a bearing 23 to a pedal shaft 22 which is mounted on both sides of a pipe fixing bracket 10 with a fixing screw 21, the fixing bracket 10 being connected to the front and rear portion of a pipe frame of a bicycle, and for transferring the drive force generated during the pedaling to a drive sprocket 30 connected through a chain to a rear wheel (not shown); a drive switching portion 50 for converting the drive force from the drive transferring portion into the forward or idle rotation of the rear wheel; and a drive coupling portion 60 for enabling the forward or idle rotation of the drive sprocket 30 according to the operation of the drive switching portion 50, in which the drive sprocket 30 is provided with an inner gear 31 formed on one side thereof to be freely rotated by means of a bearing 24.

Figure 2:
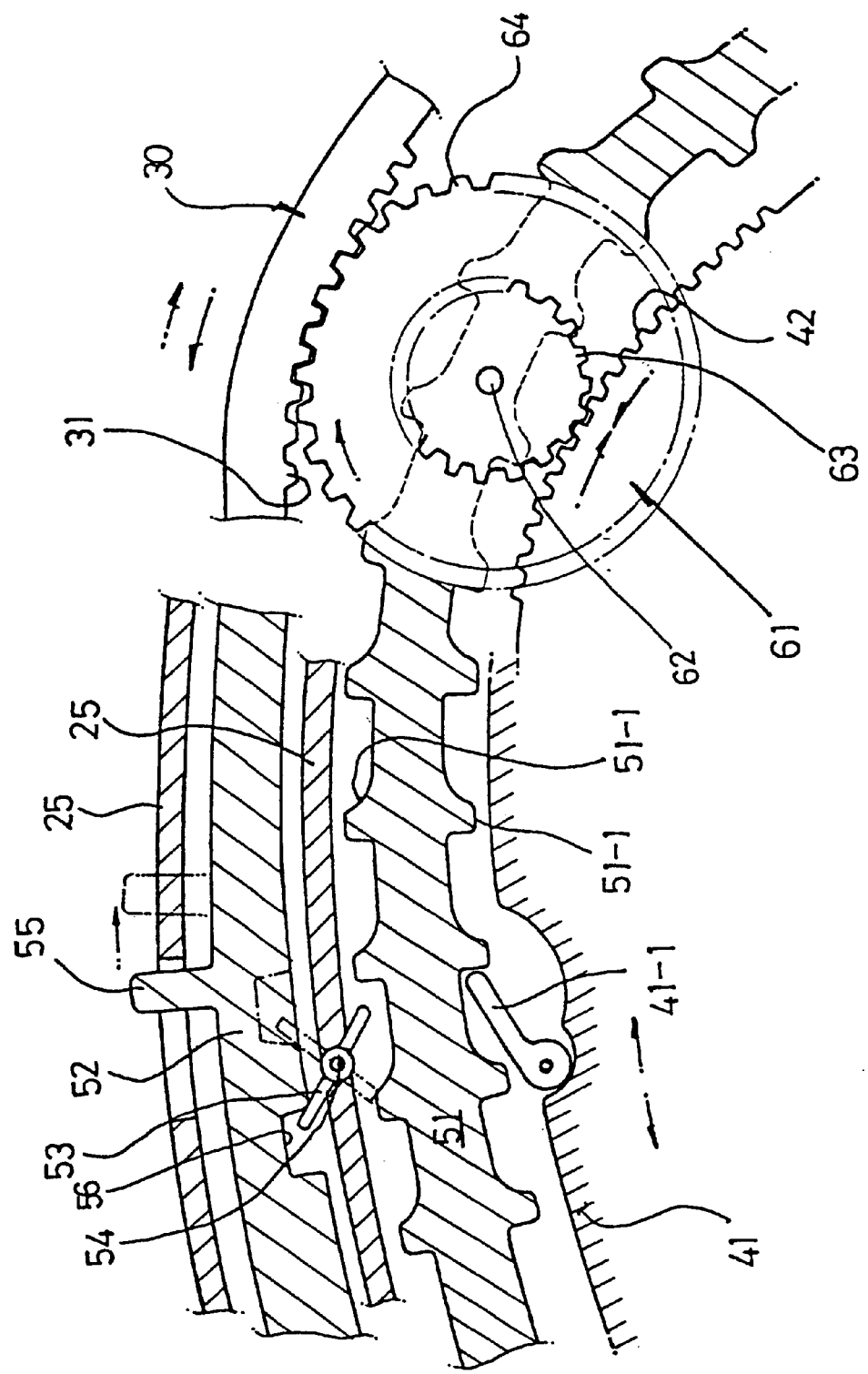
FIG. 2 is an enlarged cross-sectional view illustrating the important portion of the first embodiment of a forward-drive apparatus for a bicycle according to the invention.

The drive transferring portion 40 includes the pedal shaft 22 and a rotating wheel 41 and a rotating gear 42 which are fixed to the pedal shaft 22. The rotating wheel 41 includes one-direction fixing stopper 41-1 fixed on the circumference portion thereof, which is cooperated with a rachet wheel 51 of the drive switching portion 50 to rotate the ratchet wheel 51 only in a forward direction as shown in FIG. 2. Also, the rotating wheel 41 and the rotating gear 42 mounted on the same axis to the pedal shaft 22 are cooperated with an idle gear 61 of the drive coupling portion 60.

Thus, as the pedal shaft 22 is rotated in a forward directions the rotating wheel 41 is forward-rotated the same direction as the pedal shaft 22, so that the one-direction fixing stopper 41-1 allows the ratchet wheel 51 of the drive switching portion 50 to be forward-rotated The rotating gear 42 is also engaged with the idle gear 61 to be forward-rotated together with the rachet wheel 51. A switching stopper 53 capable of changing its position by the adjustment of a switching lever 52 from the outside is configured to rotate around a hinge axis 54 on the fixing bracket 25 threaded to the pipe fixing bracket 10 and its lower end is engaged with or separated from tooth portion 51-1 formed on the outer wheel of the ratchet wheel 51. In other words, the switching lever 52 is supported on the fixing bracket and includes a handle portion 55 projected into the outside and a hanging groove 56 formed in the inner portion thereof, thereby restraining the upper end of the switching stopper 53 in the hanging groove 56 to be rotated around the hinge axis 54.

Thus, the switching stopper 53 is hooked on or removed from the outer tooth portion 51-1 of the rachet wheel 51 according to the position selection of the switching lever 52 (as shown in a solid or phantom line in FIG. 2), thereby stopping or rotating the ratchet wheel 51.

On the other hand, as the pedal shaft 22 is rotated in a reverse direction, the rotating wheel 41 is reverse-rotated in the same direction to the pedal shaft 22. The one-direction fixing stopper 41-1 is slided into the ratchet wheel 51 to rotate the rotating wheel 41 in a reverse direction. At that time, as the rotating gear 42 is rotated in a reverse directions it is engaged with the idle gear 61 of the drive coupling portion 60, thereby rotating the idle gear 61 in a forward direction.

The drive switching portion 50 includes the ratchet wheel 51, the switching lever 52 provided on the outer circumference of the ratchet wheel and the fixing bracket 25 in the form of a cylinder cap for supporting the switching lever 52. The ratchet wheel 51 includes tooth portions 51-1 formed on the inner and outer portions thereof with one side being sloped. The ratchet wheel 51 includes the idle gears 61 rotatably mounted to the fixing axis 62. The inner tooth portion 51-1 of the rachet wheel 51 is formed to force the one-direction fixing stopper 41-1 of the drive transferring portion 40 to be hooked thereon, while it forces the ratchet wheel 51 to be rotated in a right direction. During the forward-rotating of the rotating wheel 41, the one-direction fixing stopper 41-1 of the rotating wheel 41 is engaged with the rachet wheel 51 to be rotated in a forward direction.

In order to maintain a bicycle in an idle state, the switching lever 52 is maneuvered not to hook the switching stopper 53 on the outer tooth portion 51-1 of the ratchet wheel 51. As the pedal 20 is rotated in a reverse direction, the one-direction fixing stopper 41-1 of the rotating wheel 41 is slided over the outer tooth portion 51-1 of the ratchet wheel 51 and rotated in a reverse direction, and also the ratchet wheel 51 is not controlled by the switching stopper 53 to be freely rotated. The idle gear 61 freely rotated at the fixing axis 62 of the ratchet wheel 51 loses its control force because a small gear portion 63 of the idle gear 61 and the rotating gear 42 is engaged with each other. As the rotating gear 42 is rotated in a reverse direction, the idle gear 61 is idled in a forward direction Because of it, a large gear portion 64 of the idle gear 61 is engaged with an inner gear 31 of the drive sprocket 30, but its rotation force not transferred to the drive sprocket 30. Thus, even through the pedal 20 is reverse-rotated, the drive force is not transferred to a driven sprocket. Further, during walking the bicycle the pedal 20 is kept in a standstill state.

Figure 3:
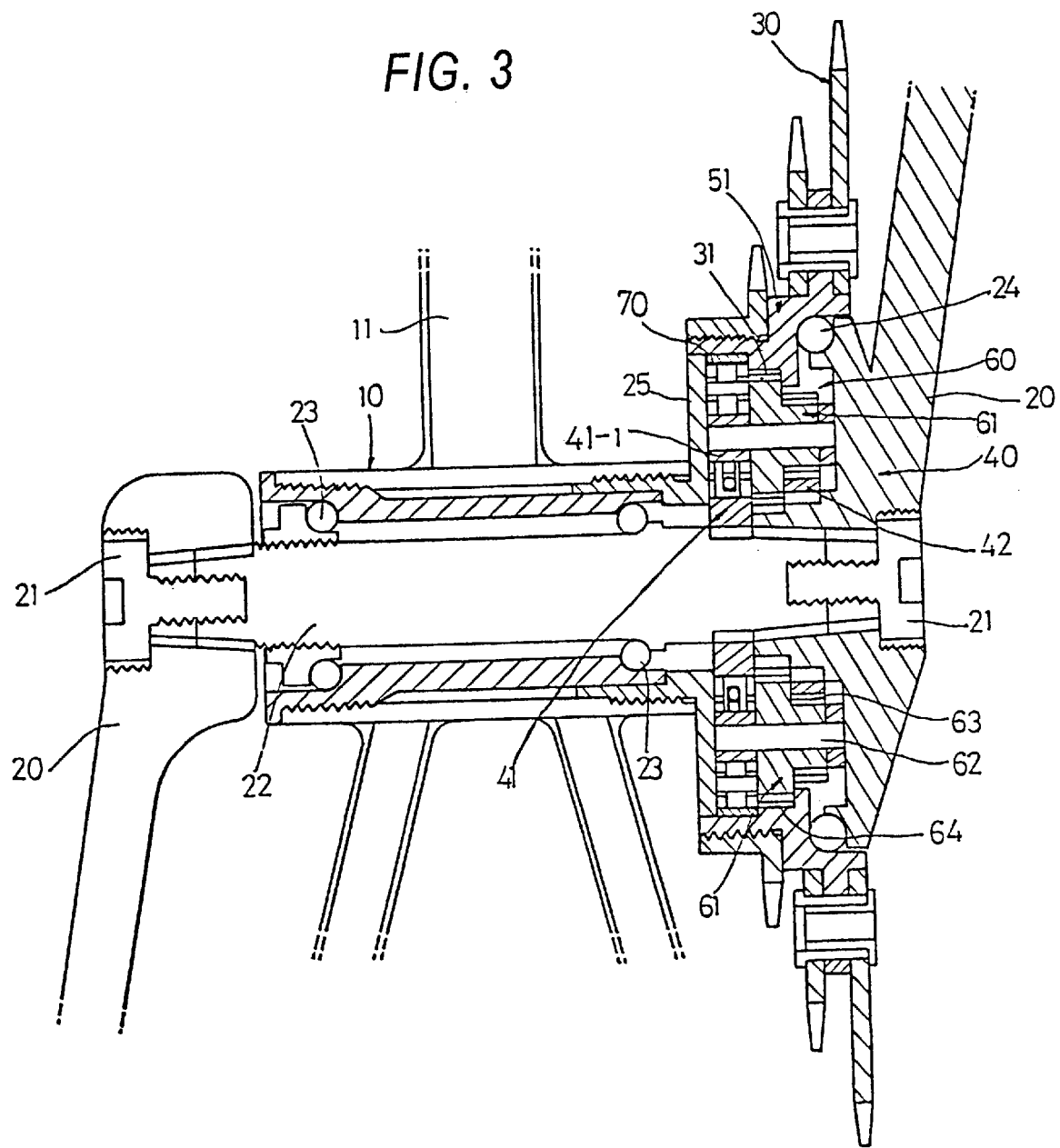
FIG. 3 is a cross-sectional view illustrating the other example of the first embodiment of a forward-drive apparatus for a bicycle according to the invention.
Figure 4:
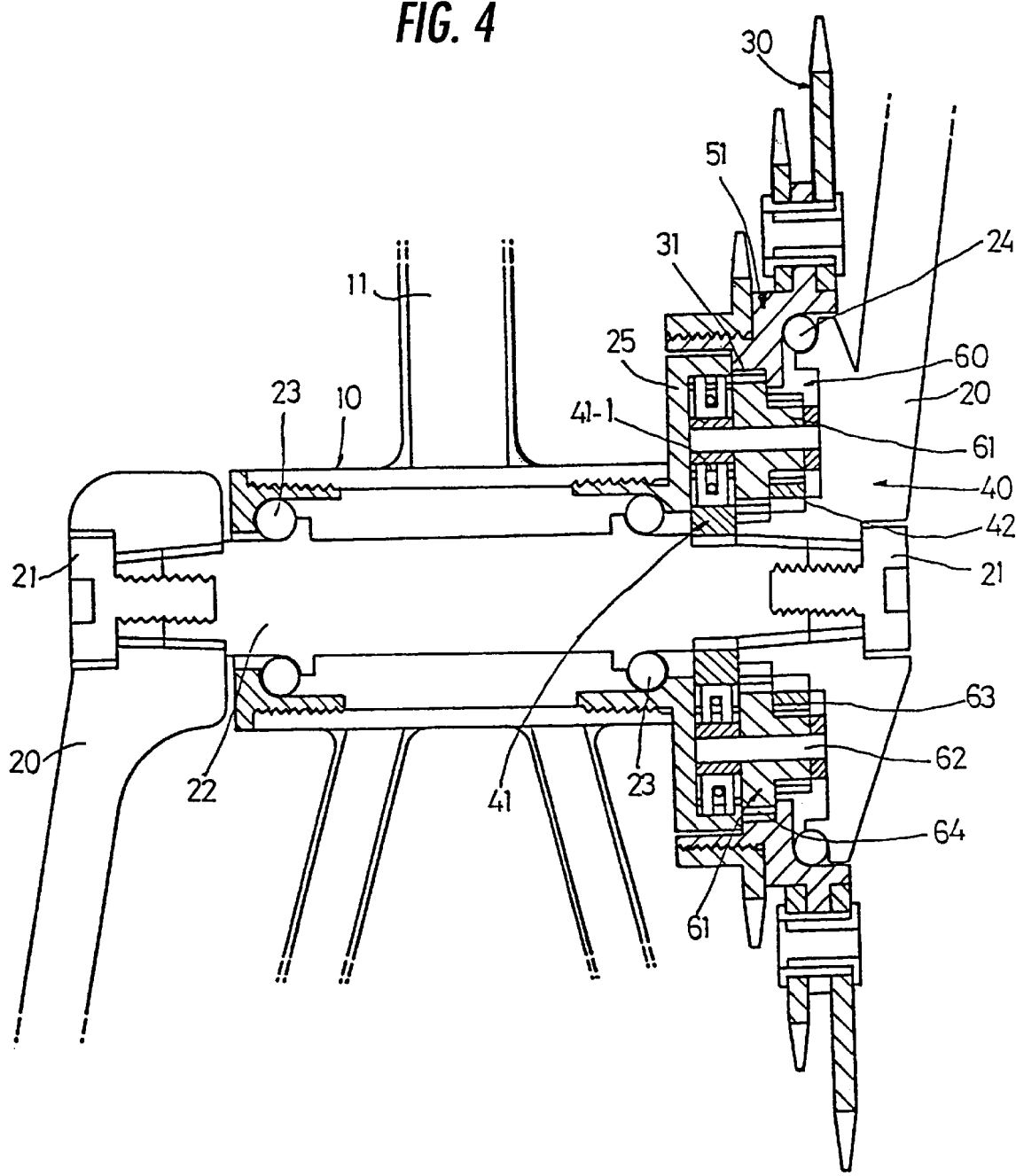
FIG. 4 is a cross-sectional view illustrating another example of the first embodiment of a forward-drive apparatus for a bicycle according to the invention.

As shown in FIGS. 3 and 4, a switching stopper 53 is elastically supported without the switching lever 52, and a swinging ring 70 with its rotation defined is contacted with the switching lever 53, so that the ratchet wheel 51 is stopped or rotated by the switching operation of the running ring 70.

The drive coupling portion 60 includes a plurality of paired idle gears 61 integrated with each other and rotatably mounted at each fixing axis 62 on one side surface of the ratchet wheel 51 of the drive switching portion 50 as shown in FIGS. 1 and 2. The small gear portion 63 of the idle gear 61 is engaged with the rotating gear 42 to be driven, and the large gear portion 64 is engaged with the inner gear 31 of the drive sprocket 30 to be driven. Thus, the rotation of the idle gear 61 mounted at the fixing axis 62 of the ratchet wheel 51 enables the drive sprocket 30 to be rotated in a forward or idle state.

The acting-effects of the first embodiment according to the invention will be as follows:

When the pedal 20 is worked in a normal state, the rotating wheel 41 and the rotating gear 42 fixed to the pedal shaft 22 are rotated in a forward movement, together. At that time, the idle gear 61 is maintained so that the small gear 63 is engaged with the rotating wheel 42, and the large gear is engaged with the inner gear 31 of the drive sprocket 30. Then, the rotating force of the rotating wheel 42 would be applied to the idle gear 61, but the driving force of the pedal 20 (the forward rotating force of the ratchet wheel 51) causes the drive sprocket 30 to be rotated in a forward direction independent of the idle gear 61, because the idle gear 61 is rotatably mounted at the fixing axis 62 of the ratchet wheel 51, but halted by the engagement with the rotating gear 42 and the inner gear 31 of the drive sprocket 30.

As the drive sprocket 30 is rotated in a forward direction, the driven sprocket connected through a chain to the drive sprocket 30 causes a rear wheel to be rotated in a forward direction, thereby working a bicycle in a forward movement. Herein, it is noted that the rear wheel is provided with the driven sprocket selectively rotated by one-direction clutch.

On the other hand, when the switching lever 53 is engaged with the outer tooth portion 51-1 of the ratchet wheel 51 as shown in a solid line in FIG. 2 and the pedal 20 is worked in a reverse direction, the rotating wheel 41 and the rotating gear 42 fixed to the pedal shaft 22 are rotated in a reverse movement, together. Thus, the one-direction fixing stopper 41-1 of the rotating wheel 41 is passed over the inner tooth portion 51-1 of the ratchet wheel 51 to be rotated in a reverse direction, and the ratchet wheel 51 is hooked on the switching stopper 53 not to be rotated. At that time, as the rotating gear 42 is reverse-rotated, the idle gear 61 is rotated in a forward direction with its small gear portion 63 being engaged with the rotating gear 42. Then, the idle gear 61 forces the drive sprocket 30 to be forward-rotated with its large gear portion 64 being engaged with the inner gear 31 of the drive sprocket 30. Therefore, as if the pedal 20 is worked in a normal state, the rotating force of the drive sprocket 30 forces the driven sprocket connected by means of the chain to the drive sprocket 30 to be rotated in a forward direction, thereby working the bicycle in a forward movement.

As described above, according to the switching lever operation of users, the bicycle is traveled in a forward movement during the pedaling or back-pedaling, but it is maintained in an idle state like a conventional bicycle as well. It offers users the wide range of traveling choice and relieves user's fatigue.

Figure 5:
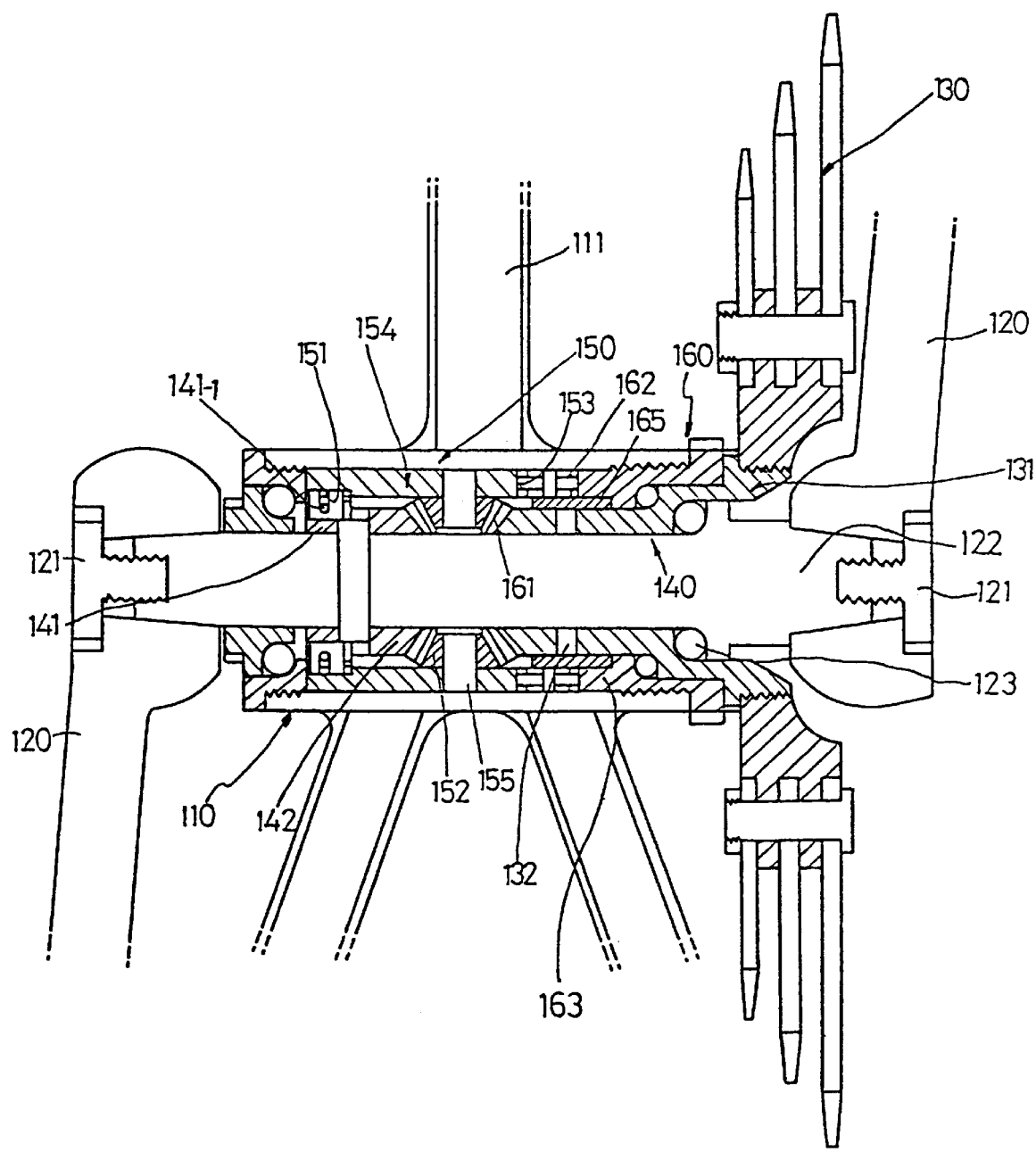
FIG. 5 is a cross-sectional view illustrating a second embodiment of a forward-drive apparatus for a bicycle according to the invention.

A second embodiment of the invention will be explained in detail as follows:

As shown in FIG. 5, a pedal 120 is mounted by means of a fixing screw 121 on both sides of a pipe bracket 110 which is connected to the front or rear portions of a pipe frame 111 to be rotated by a bearing 123. A drive transferring portion 140 is configured so that when the pedal 120 is worked, the force can be transferred to a drive sprocket 130 following by a rear wheel and a chain (not shown). The drive transferring portion 140 includes a rotating wheel 141 and a first bevel gear 142 which are fixed to the pedal shaft 122 to be rotated according to the working of the pedal 120.

A drive switching portion 150 comprises a ratchet cylinder 154 provided with a ratchet tooth portion 151, a second bevel gear 152 and a side ratchet tooth portion 153 which are formed around the outer circumference of the drive transferring portion 140. It causes the driving force transferred from the drive transferring portion 140 to be converted into the forward or idle rotation of a driven sprocket since the rotating wheel 141 is cooperated with the first bevel gear 142.

A drive coupling portion 160 is connected to the second bevel gear 152 and a third bevel gear 163 of the ratchet cylinder 154 to be operated together and includes a switching stopper 162 for operating or stopping the ratchet cylinder 154, thereby rotating the drive sprocket 130 in a forward or idle state. In other words, the drive sprocket 130 is coupled with a rotating cylinder 131 rotatably mounted to the pedal shaft 122, so that it is rotatable to the pedal shaft 122.

On the other hand, the rotating wheel 141 includes one-direction fixing stopper 141-1 fixed on the circumference portion thereof, which is cooperated with the rachet cylinder 154 of the drive switching portion 150 to rotate the ratchet cylinder 154 in a forward direction. Also, the rotating wheel 141 and the first bevel gear 142 mounted on the same axis to the pedal shaft 122 are engaged with the second bevel gear 152 of the drive switching portion 150.

Thus, as the pedal shaft 122 is rotated in a forward direction, the rotating wheel 141 is reverse-rotated in the same direction as the pedal shaft 122, so that the one-direction fixing stopper 141-1 allows the ratchet cylinder 154 of the drive switching portion 150 to be forward-rotated. The first bevel gear 142 is also engaged with the second bevel gear 152 to be forward-rotated together with the rachet cylinder 154.

Also, as the pedal shaft 122 is rotated in a reverse direction, the rotating wheel 141 is reverse-rotated in the same direction as the pedal shaft 122, so that the one-direction fixing stopper 141-1 is slipped over the ratchet cylinder 154 of the drive switching portion 150, and thus only the rotating wheel 141 is reverse-rotated. The first bevel gear 142 is also engaged with the second bevel gear 152, thereby rotating the second bevel gear 152 in a forward direction.

As shown in FIG. 5, the drive switching portion 150 includes the ratchet cylinder 154 rotatably mounted in the pipe fixing bracket 110 and a plurality of second bevel gears 152 rotatably provided on the vertical fixing shaft 155 in the ratchet cylinder 154. The ratchet cylinder 154 includes a tooth portion 151 formed on the inner portion thereof with one side being sloped. The inner tooth portion 151 of the rachet cylinder 154 is formed to force the one-direction fixing stopper 141-1 of the rotating wheel 141 to be hooked thereon, while it forces the ratchet cylinder 154 to be rotated in a forward direction. During the forward-rotating of the rotating wheel 141, the one-direction fixing stopper 141-1 of the rotating wheel 141 is engaged with the rachet cylinder 154 to be rotated in a forward direction. Also, on the side surface of the ratchet cylinder 154 there is formed a side ratchet tooth portion 153 to be engaged with a switching stopper 153 of the drive coupling portion 160.

The drive coupling portion 160 includes a rotating cylinder 131 coupled through the second bevel gear 152 of the drive switching 150 to a third bevel gear 161 and a fixing cylinder 163 provided with a fixing cylinder 163 around the circumference of the rotating cylinder 131 to operate or stop the ratchet cylinder 154 as shown in FIG. 6. The rotating cylinder 131 is rotatable mounted on the pedal shaft 122 and includes the drive sprocket 130 fixed thereon. The rotating cylinder 131 includes the third bevel gear 162 formed on the side surface thereon and engaged with the second gear 152 to be rotated together therewith. The part of the bevel gear 161 is coupled with the rotating cylinder 131 by means of the coupler 132 to rotate the drive sprocket 130 in a forward or idle state.

Figure 6A:
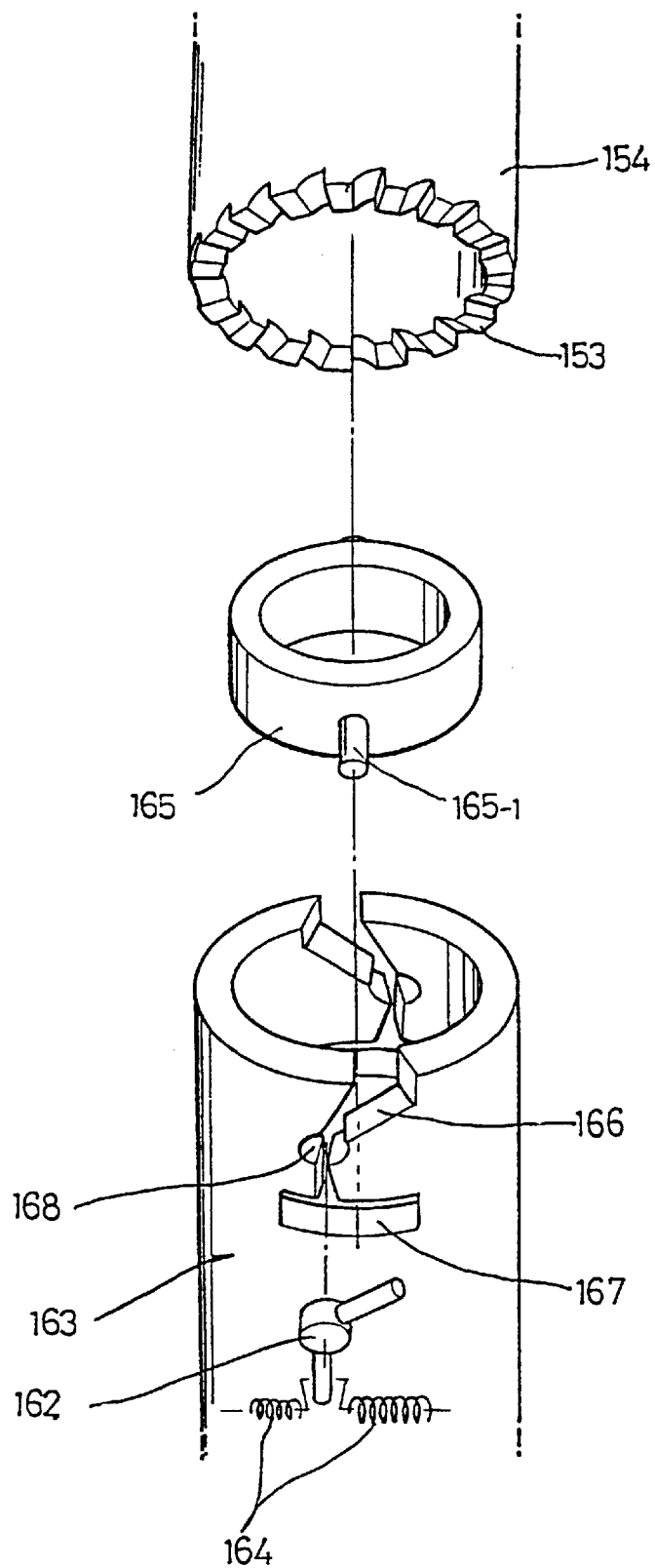
FIGS. 6A, 6B and 6C are an exploded perspective view and plane views illustrating the important portions of FIG. 5.
Figure 6B:
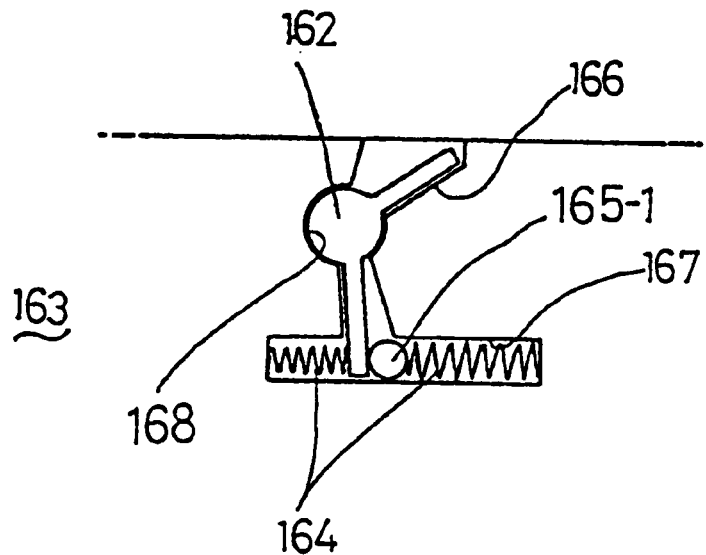
Figure 6C:
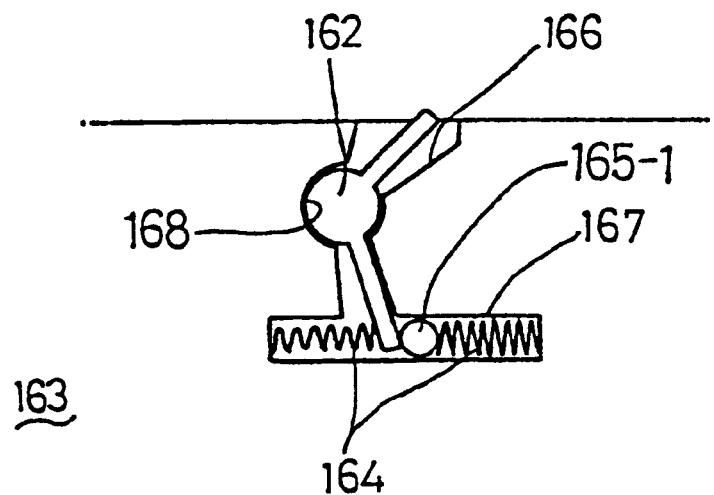

As shown in FIGS. 6A, 6B and 6C, a switching stopper 162 is elastically mounted on the fixing cylinder 163 by means of springs 164. Thus, the switching stopper 162 is hooked or removed on the side ratchet tooth portion 153 of the rachet cylinder 153 by a fixing pin 165-1 provided on a moving member 165 of a cylinder type. The moving member 165 is rotatably mounted around the outer circumference of the rotating cylinder 131, in which the fixing pin 165-1 is inserted into a seat hole 167 along a cutting groove 166. The cutting groove 166 is communicated with the seat hole 167 through a hinge hole 168 The switching stopper 162 is in the form of a > character, the center portion of which is elastically supported in the hinge hole 168 by means of the spring 164, the one portion of which is elastically supported in the cutting hole 166 by means of the spring 164, and the other portion of which is elastically supported in the seat hole 167 by means of the spring 164. Also, the switching stopper 162 is configured so that its one end portion is elastically movable at the center of the hinge hole 168 by means of springs 164 and its other end portion is engaged with or separated from the side ratchet tooth portion 153 of the ratchet cylinder 154.

Therefore, the switching stopper 162 is engaged with the side ratchet tooth portion 153 of the ratchet cylinder 154 by means of the fixing pin 165-1 of the moving member 165 during the forward-rotating of the drive sprocket 130, but removed from the side ratchet tooth portion 153 of the ratchet cylinder 154 during the reverse or idle-rotating. The engagement or removal of the switching stopper 162 with or from the side ratchet tooth portion 153 causes the ratchet cylinder 154 to be stopped or rotated.

The acting-effects of the second embodiment according to the invention will be as follows:

When the pedal 120 is worked in a normal state, the rotating wheel 141 and the first bevel gear 142 fixed to the pedal shaft 122 are rotated in a forward movement, together. At that time, since the one-direction fixing stopper 141-1 of the rotating wheel 141 is engaged with the inner tooth portion 151 of the ratchet cylinder 154, the rotating wheel 141 rotates the ratchet cylinder 154 in a forward direction. The first bevel gear 142 is engaged with the second bevel gear 152, and the second bevel gear 152 is engaged with the third bevel gear 161 of the rotating cylinder 131 to which the drive sprocket 130 is mounted. Herein, it is noted that the rotating force of the first bevel gear 142 is applied to the second bevel gear 152, and the second bevel gear 152 is rotatably mounted on the vertical fixing axis 155 of the ratchet cylinder 154, but since the second bevel gear 152 is engaged with each of the first bevel gear 142 and the third bevel gear 161 to be maintained in a standstill state, the forward driving force of the pedal 120 (the forward rotating force of the ratchet cylinder 154) does not rotate the second bevel gear 152, but rotates the drive sprocket 130 in a forward direction.

As the drive sprocket 130 is rotated in a forward direction, the driven sprocket connected through a chain to the drive sprocket 130 causes a rear wheel to be rotated in a forward direction, thereby working a bicycle in a forward movement. Herein, it is noted that the rear wheel is provided with the driven sprocket selectively rotated by one-direction clutch.

On the other hand, as the drive sprocket 130 is rotated in a reverse direction, the rotating wheel 141 and the bevel gear 142 attached to the pedal shaft 122 is rotated in a reverse direction, together according to the rotation of the pedal shaft 122. Thus, the one-direction fixing stopper 141-1 of the rotating wheel 141 is passed over the inner tooth portion 151 of the ratchet cylinder 154 to be rotated in a reverse direction, and the ratchet cylinder 154 is hooked on the switching stopper 162 not to be rotated. The first bevel gear 142 is engaged with the second bevel gear 152 to be operated, together. But, as the first bevel gear 142 is reverse-rotated with the second bevel gear 152 being engaged with the third bevel gear 161, the third bevel gear 161 is forward-rotated, and also the rotating cylinder 131 is forward-rotated. Then, the rotating cylinder 131 forces the drive sprocket 130 to be forward-rotated. Therefore, as if the pedal 20 is worked in a normal state, the rotating force of the drive sprocket 130 forces the driven sprocket connected by means of the chain to the drive sprocket 130 to be rotated in a forward direction, thereby working the bicycle in a forward movement.

On the other hand, in the case of the idle operation of a bicycle, as the pedal 120 is rotated in a reverse direction, the rotating cylinder 131 is reverse-rotated While the moving member 165 rotatably mounted around the outer circumference of the rotating cylinder 131 is rotated in a reverse direction as shown in FIG. 6C. The fixing pin 165-1 of the moving member 165 forces the switching stopper 162 to be separated from the side ratchet tooth portion 153 of the ratchet cylinder 154. Thus, the ratchet cylinder 154 is not controlled by the switching stopper 162 to be freely rotated. And the second bevel gear 152 loses its control force because the second bevel gear 152 and the third bevel gear 161 are engaged with each other. As the third bevel gear 161 is rotated in a reverse direction, the second bevel gear 152 is idle-rotated. Therefore, even if the pedal 120 is reverse-rotated, the driving force is not transferred to the driven sprocket. Further, during walking the bicycle the pedal 120 is kept in a standstill state. Also, the bicycle is traveled in a forward movement during the pedaling or back-pedaling, but it is maintained in an idle state like a conventional bicycle as well. It offers users the wide range of traveling choice and relieves user's fatigue.

Figure 7:
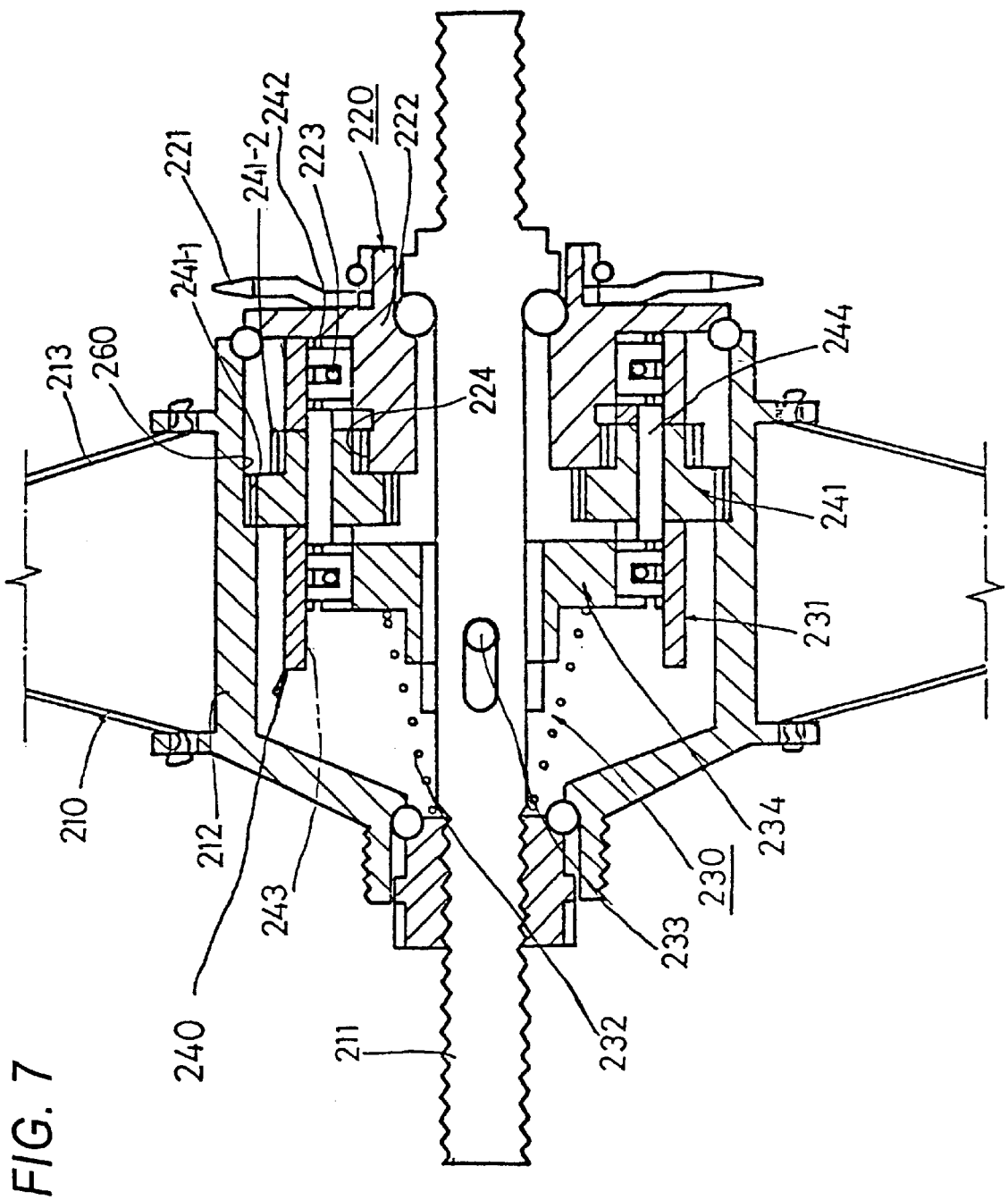
FIG. 7 is a cross-sectional view illustrating a third embodiment of a forward-drive apparatus for a bicycle according to the invention.

A third embodiment of the invention will be explained in detail as follows:

As shown in FIG. 7, according to the invention a forward-drive apparatus for a bicycle comprises a drive transferring portion 220 including a hub 212 rotatably supported by means of a bearing on a rear wheel shaft 211 with a plurality of wheel supporting ribs 210 being fixed thereto, a driven sprocket 221 coupled by means of a chain to a drive sprocket of a pedal shaft being mounted on a rotating wheel 222 rotatable attached to the rear wheel shaft 211, and for transferring the drive force generated by the driven sprocket 221 to the rear wheel 210; a drive switching portion 230 for transferring the driving force from the rotating wheel 222 to a ratchet cylinder 231 and converting the driving force into the forward or idle rotation of the rear wheel 210; and a drive coupling portion 240 for enabling the forward or idle rotation of the rear-wheel 210 according to the operation of the drive switching portion 230.

The rotating wheel 222 includes one-direction fixing sprocket 223 engaged with the rachet cylinder 231 to be rotated centering around the rear wheel shaft 211 along with the driven sprocket 221 in a forward or idle state and a plain gear 224 engaged with the drive coupling portion 240 to be operated together. Herein, it is noted that the rotating wheel 222 rotates the ratchet cylinder 231 in a forward rotation direction of the pedal shaft. The plain gear 224 is engaged with an idle gear 241 of the drive coupling portion 240 to be operated together.

Thus, as the pedal shaft is rotated in a forward direction, the rotating wheel 222 is forward-rotated in the same direction as the pedal shaft, so that the one-direction fixing stopper 223 allows the ratchet cylinder 231 of the drive switching portion 230 to be forward-rotated. The plain gear 224 is also engaged with the idle gear 241 to be forward-rotated together with the rachet cylinder 231.

Also, as the pedal shaft is rotated in a reverse direction, the rotating wheel 222 is reverse-rotated in the same direction as the pedal shaft, so that the one-direction fixing stopper 223 is slipped over the ratchet cylinder 231 of the drive switching portion 230, and thus only the plain gear 224 is reverse-rotated. The plain gear 224 is also engaged with the idle gear 241, thereby rotating the idle gear 241 in a forward direction.

As shown in FIG. 7, the drive switching portion 230 is configured so that the stopper wheel 234 is moved leftward and rightward by a lever 233 to be engaged with or separated from the ratchet tooth portion 243 of the ratchet cylinder 231 with one side portion being supported on the rear wheel shaft 211 by a spring 232 and rotates the ratchet cylinder 231 in a forward or idle state in response to the driving force of the driving sprocket 231.

The ratchet cylinder 231 is rotatably mounted around the outer circumference of the rotating wheel 222 and the stopper wheel 234, and includes ratchet tooth portions 242 and 243 formed on the left and right inner portions thereof. The rotating wheel 222 and the stopper wheel 234 each is engaged with the ratchet tooth portions 242 and 243. In the ratchet cylinder 231 the idle gear 241 of the drive coupling portion 240 is rotatably formed with being inserted in the fixing axis 244. Thus, the ratchet tooth portion 243 of the rachet cylinder 231 is formed to force the one-direction fixing stopper 223 of the rotating wheel 222 to be hooked thereon, while it forces the ratchet cylinder 231 to be rotated in a forward direction. During the forward-rotating of the rotating wheel 231, the one-direction fixing stopper 223 of the rotating wheel 222 is engaged with the rachet cylinder 231 to be rotated in a forward direction. Also, the stopper wheel 234 changing its position by a lever 233 adjustable from the outside is moved leftward and rightward along the rear wheel shaft 211 to be engaged with or separated from the ratchet tooth portion 243. Thus, the stopper wheel 234 is hooked on or removed from the ratchet tooth portion 243 to allow the ratchet cylinder 231 to be stopped or rotated.

Figure 8:
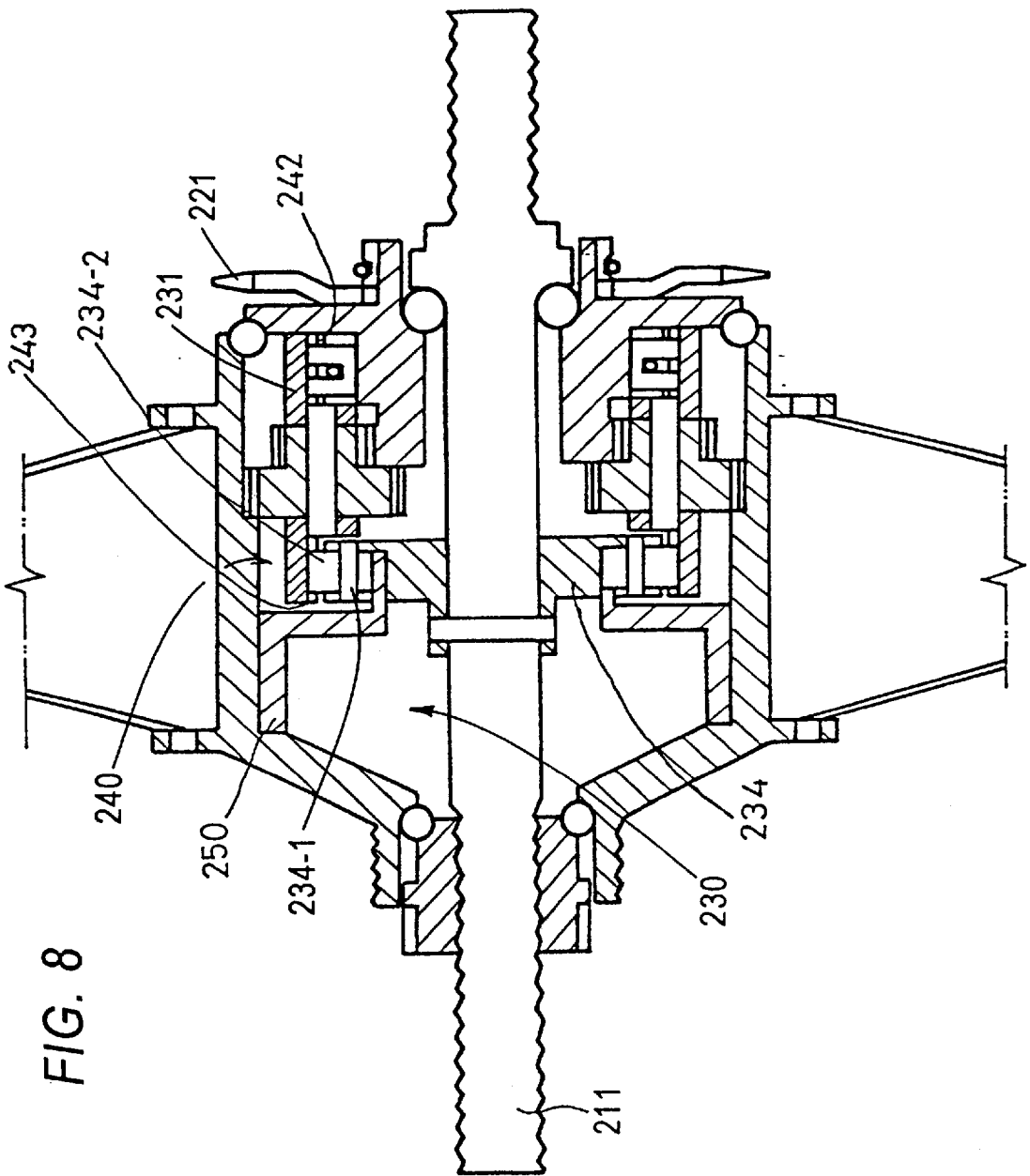
FIG. 8 is a cross-sectional view illustrating the other example of the third embodiment of a forward-drive apparatus for a bicycle according to the invention.
Figure 9A:
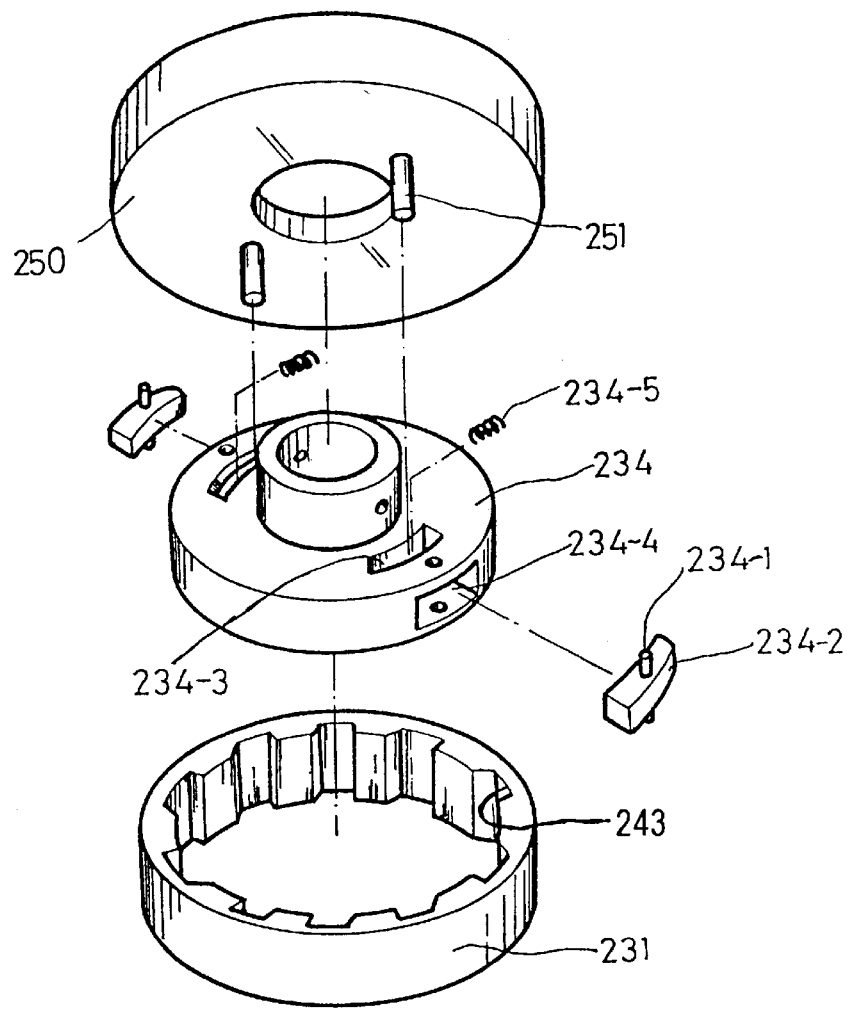
FIGS. 9A and 9B are an enlarged separate perspective view an enlarged cross-sectional view illustrating the important portion of FIG. 8.
Figure 9B:
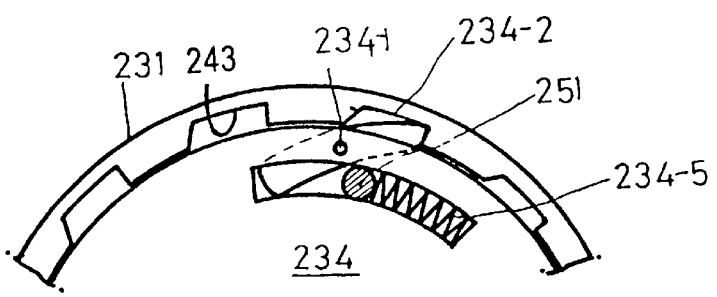
Figure 10:
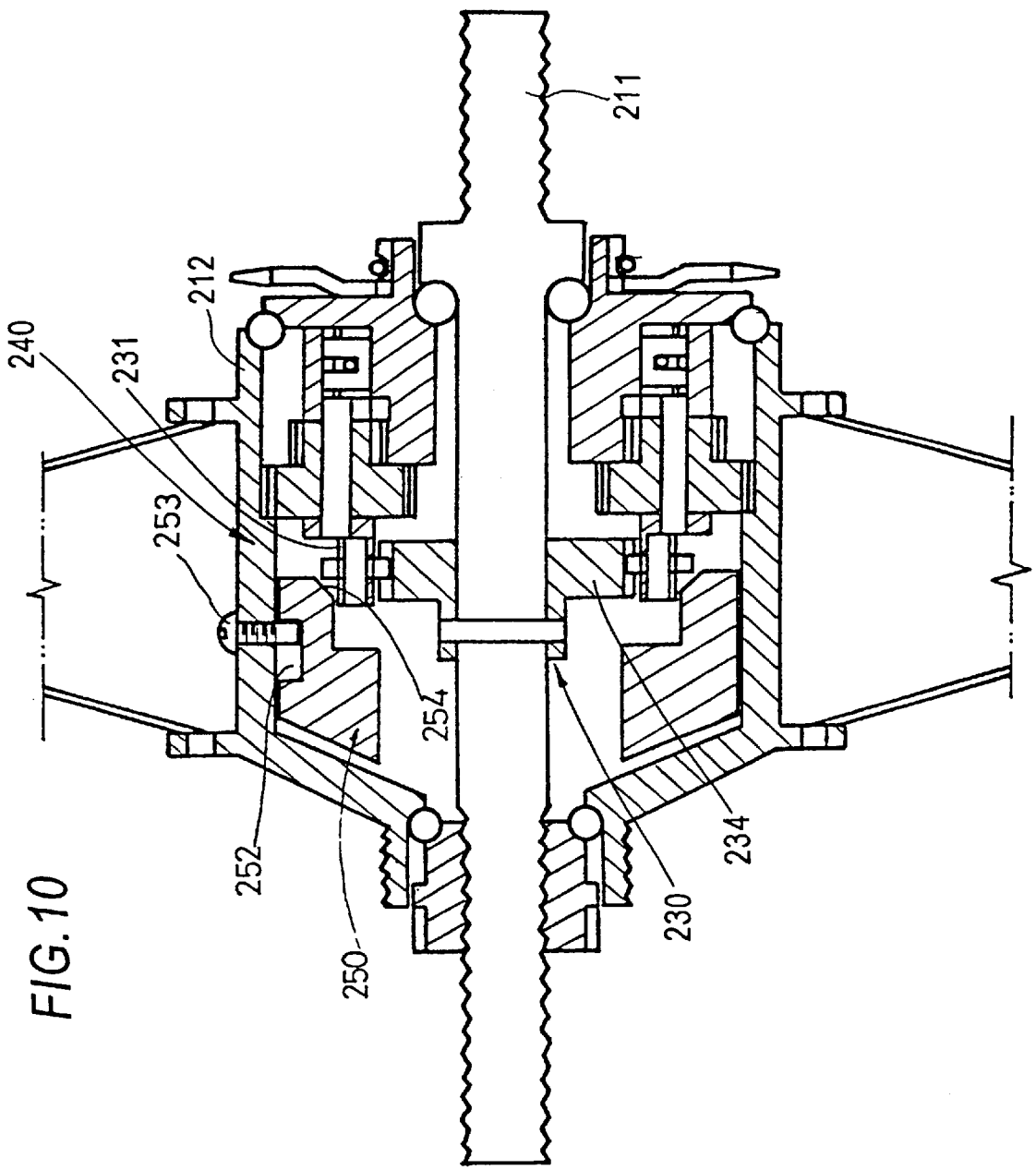
FIG. 10 is a cross-sectional view illustrating another example of the third embodiment of a forward-drive apparatus for a bicycle according to the invention.

FIG. 8 to FIG. 10 shows examples except for a lever. The stopper wheel 234 is mounted in the ratchet cylinder 234 of the rear wheel shaft, which includes an elastic stopper 234-2 rotated centering around a hinge axis 234-1 by a moving cylinder member 250, so that the elastic stopper 234-2 is coupled with or removed from the ratchet tooth portion 243 to stop or forward-rotate the ratchet cylinder 231 in response to the driving force of the driven sprocket 221.

As shown in FIGS. 8 and 9, the fixing pin 251 is formed on the side surface of the moving cylinder member 250 to be inserted into a side hole 234-3 of the stopper wheel 234 while to be contacted with the elastic stopper 234-2. Also, the stopper wheel 234 includes a elongated hole 234-4 formed thereon to be freely rotated by the hinge axis 234-1. The elastic stopper 234-2 is hooked on or separated from the ratchet tooth portion 243 according to the rotation of the moving cylinder member 250.

Figure 11:
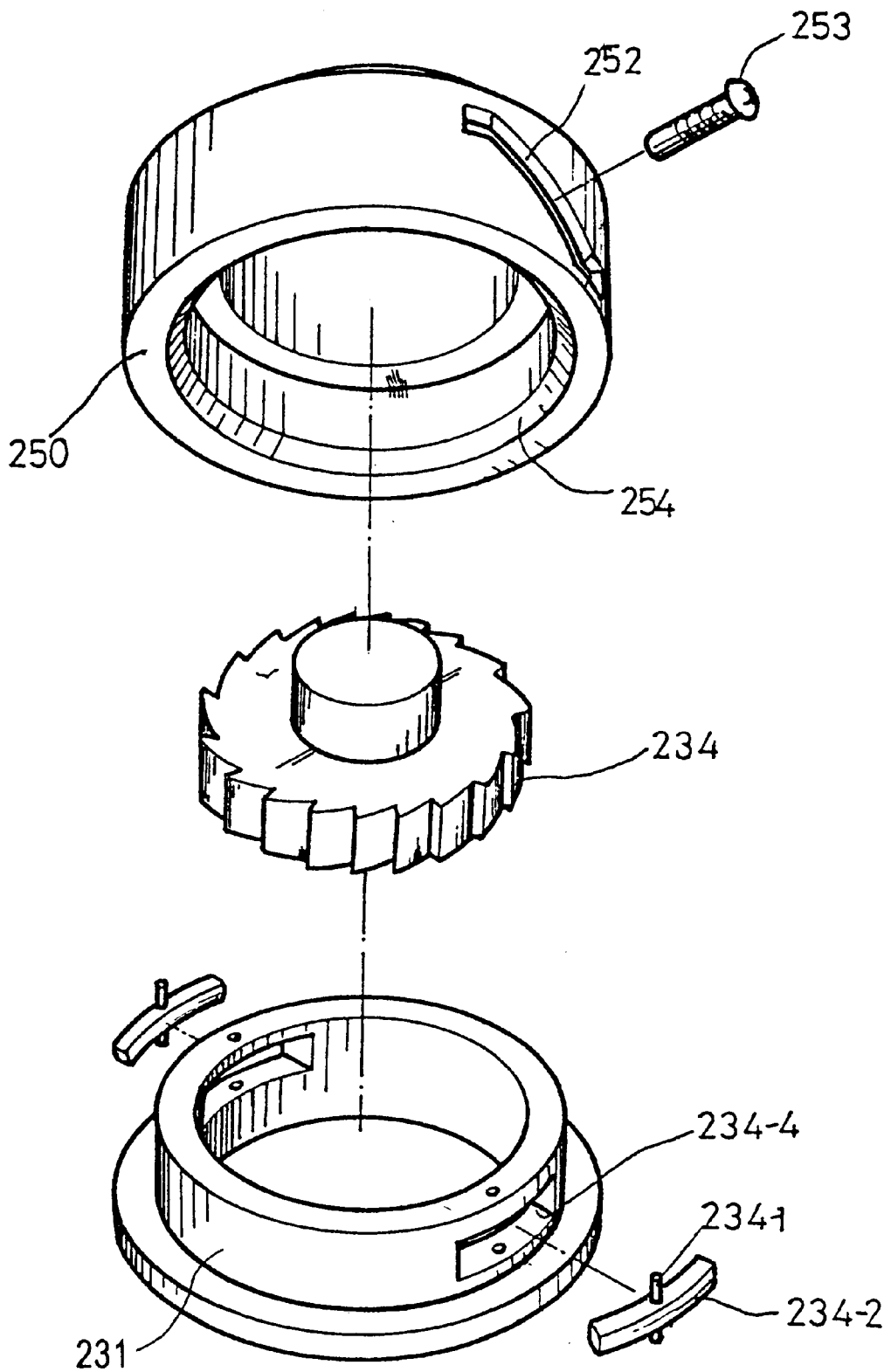
FIG. 11 is an enlarged cross-sectional view illustrating the important portion of FIG. 10.
Figure 12:
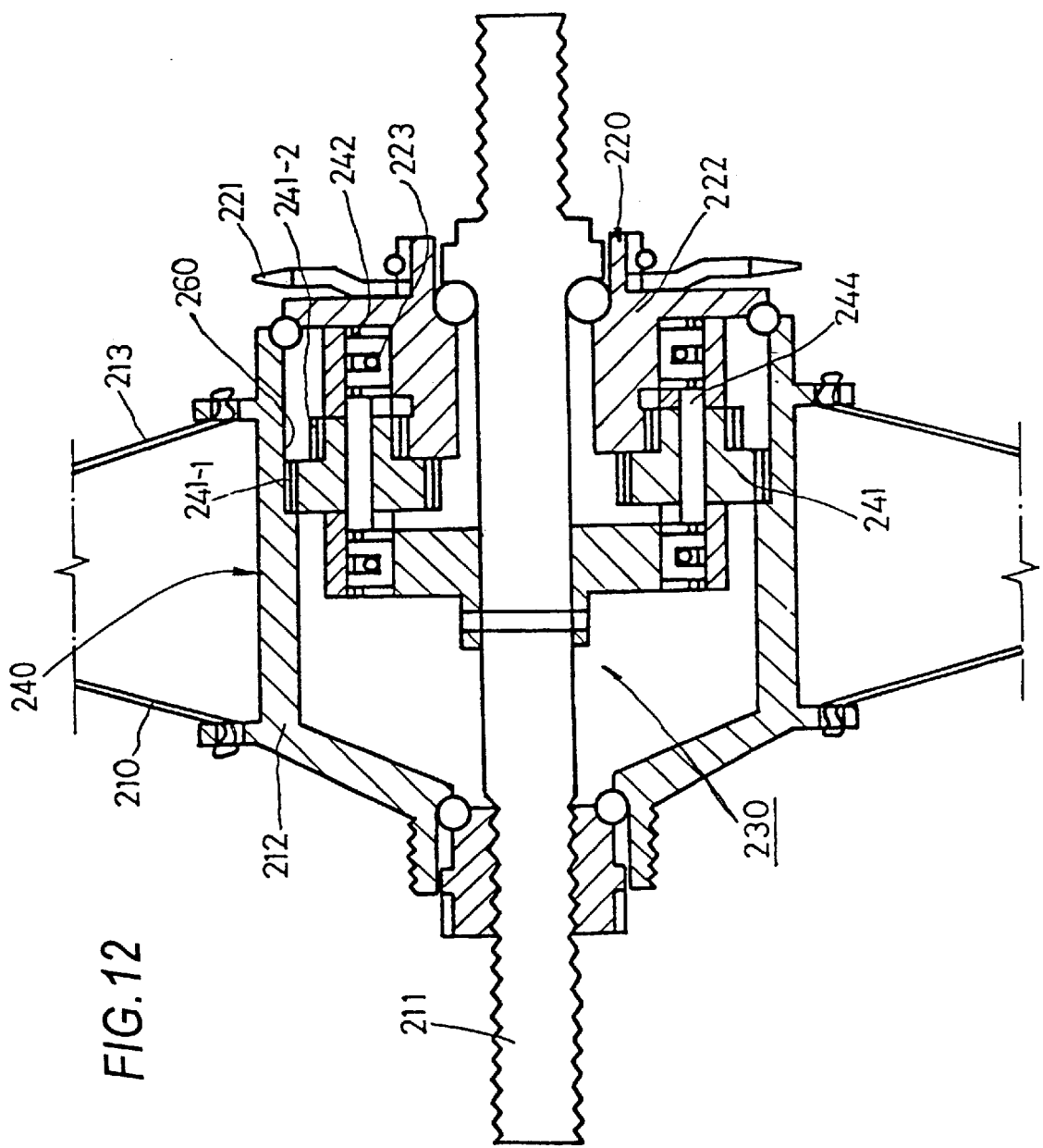
FIG. 12 is a cross-sectional view illustrating another example of the third embodiment of a forward-drive apparatus for a bicycle according to the invention.

As shown in FIGS. 10 and 11, the moving cylinder member 250 includes a cutting groove 252 formed around the circumference thereof into which a pin 253 fixed to the hub 212 of the rear wheel is inserted to move the moving cylinder member 250 leftward and rightward. Also, the moving cylinder member 250 includes a slope surface formed around the inner circumference thereof to be contacted with the elastic stopper 234-2.

Referring to FIG. 11 the ratchet cylinder 231 includes the elongated groove 234-1 formed around the circumference thereof to permit the elastic stopper 234-2 to be freely rotated by the hinge axis 234-1, so that the slope surface 254 of the moving cylinder member 250 is contacted with the elastic stopper 234-2 to be hooked on or removed from the ratchet tooth portion 234 of the ratchet wheel 234.

As shown in FIG. 7 to FIG. 12, the drive coupling portion 240 includes a plurality of paired idle gears 241 integrated with each other and rotatably mounted at each of fixing axis 244 in the ratchet cylinder 231 of the drive switching portion 230 as shown in FIG. 7. One portion of the idle gear 241 is engaged with the plain gear 224 of the drive transferring portion 220 to be driven therewith, and the other portion is engaged with the inner gear 230 formed on the hub 212 to be driven, so that the rear wheel 210 is forward-rotated or idle-operated. In other words, the small gear portion 241-1 of the idle gear 241 is engaged with the plain gear 224 of the drive transferring portion 220, and its large gear portion 241-2 is engaged with the inner gear 230 formed on the hub 212. Thus, the rotation of the idle gear 241 rotatably mounted an the fixing axis 244 forces the rear wheel 210 to be forward-rotated or idle-operated.

The acting-effects of the third embodiment according to the invention will be as follows:

Firstly, the lever 233 is moved leftward, and the stopper wheel 234 is removed from the ratchet tooth portion 234 of the ratchet cylinder 231. At that time, as the pedal is worked in a normal state, the driven sprocket 221 connected through the chain to the drive sprocket is rotated in a forward direction. Then, since the one-direction fixing stopper 223 of the rotating wheel 222 is engaged with the inner tooth portion 243 of the ratchet cylinder 231, the rotating wheel 231 rotates the ratchet cylinder 231 in a forward direction. But, the idle gear 241 of the ratchet cylinder 231 is engaged with the small gear portion 241-2 of the idle gear 241, and the large gear portion 241-1 of the idle gear 241 is engaged with the inner gear 260 of the hub 212. Herein, it is noted that the rotating force of the plain wheel 224 is applied to the idle gear 224, but since the idle gear 241 is rotatably mounted on the fixing axis 244 of the ratchet cylinder 231 and also engaged with each of the plain gear 224 and the inner gear 260 of the hub 212 to be maintained in a standstill state, the forward driving force of the pedal (the forward rotating force of the ratchet cylinder 231) does not rotate the idle gear 241, but rotates the hub 212 of the rear wheel 210 in a forward direction. Therefore, the rotating force of the driven sprocket 221 rotates the rear wheel 210 in a forward direction, thereby working the bicycle in a forward movement.

On the other hand, when the lever 233 is moved rightward, and the stopper wheel 234 is hooked on the ratchet tooth portion 234 of the ratchet cylinder 231, while the pedal is worked in a reverse rotation, the driven sprocket 221 is rotated in a reverse direction together with the rotating wheel 222 and its plain gear 224. Then, the one-direction fixing stopper 223 of the rotating wheel 222 is passed over the inner tooth portion 243 of the ratchet cylinder 231 to be reverse-rotated, the ratchet cylinder 231 gets hooked on the stopper wheel 234 to force the ratchet cylinder 231 to be kept in a standstill state. But, since the idle gear 241 of the ratchet cylinder 231 is engaged with the small gear portion 241-2 of the idle gear 241, the idle gear 241 is forward-rotated, and also since the large gear portion 241-1 of the idle gear 241 is engaged with the inner gear 260 of the hub 212, the rear wheel 210 is forward-rotated to work the bicycle in a forward movement.

Therefore, during the back-pedaling the bicycle is moved in a forward direction by forward-rotating the rear wheel like the pedaling.

On the other hand, in the case of the idle operation of the bicycle, the lever 233 is first maneuvered to prevent the stopper wheel 234 from hooking on the ratchet tooth portion 234 of the ratchet cylinder 231. Then, as the pedal is worked in a reverse rotation, the one-direction fixing stopper 223 of the rotating wheel 222 is passed over the inner tooth portion 243 of the ratchet cylinder 231 to be reverse-rotated, the ratchet cylinder 231 is not controlled by the stopper wheel 231 to be freely rotated. Thus, the idle gear 241 rotatably mounted on the fixing axis 244 of the ratchet cylinder 231 loses its control force with the small gear portion 241-2 of the idle gear 241 being engaged with the plain gear 224. As the plain gear 224 is rotated in a reverse direction, the idle gear 241 is idle-rotated in a forward direction. Since the large gear portion 241-1 of the idle gear 241 is engaged with the inner gear 260 of the hub 212, it does not transfer the driving force to the rear wheel 210. Therefore, even if the pedal is reverse-rotated, the driving force is not transferred to the driven sprocket. Further, during walking the bicycle the pedal is kept in a standstill state. Also, the bicycle is traveled in a forward movement during the pedaling or back-pedaling, but it is maintained in an idle state like a conventional bicycle as well.

Figure 13:
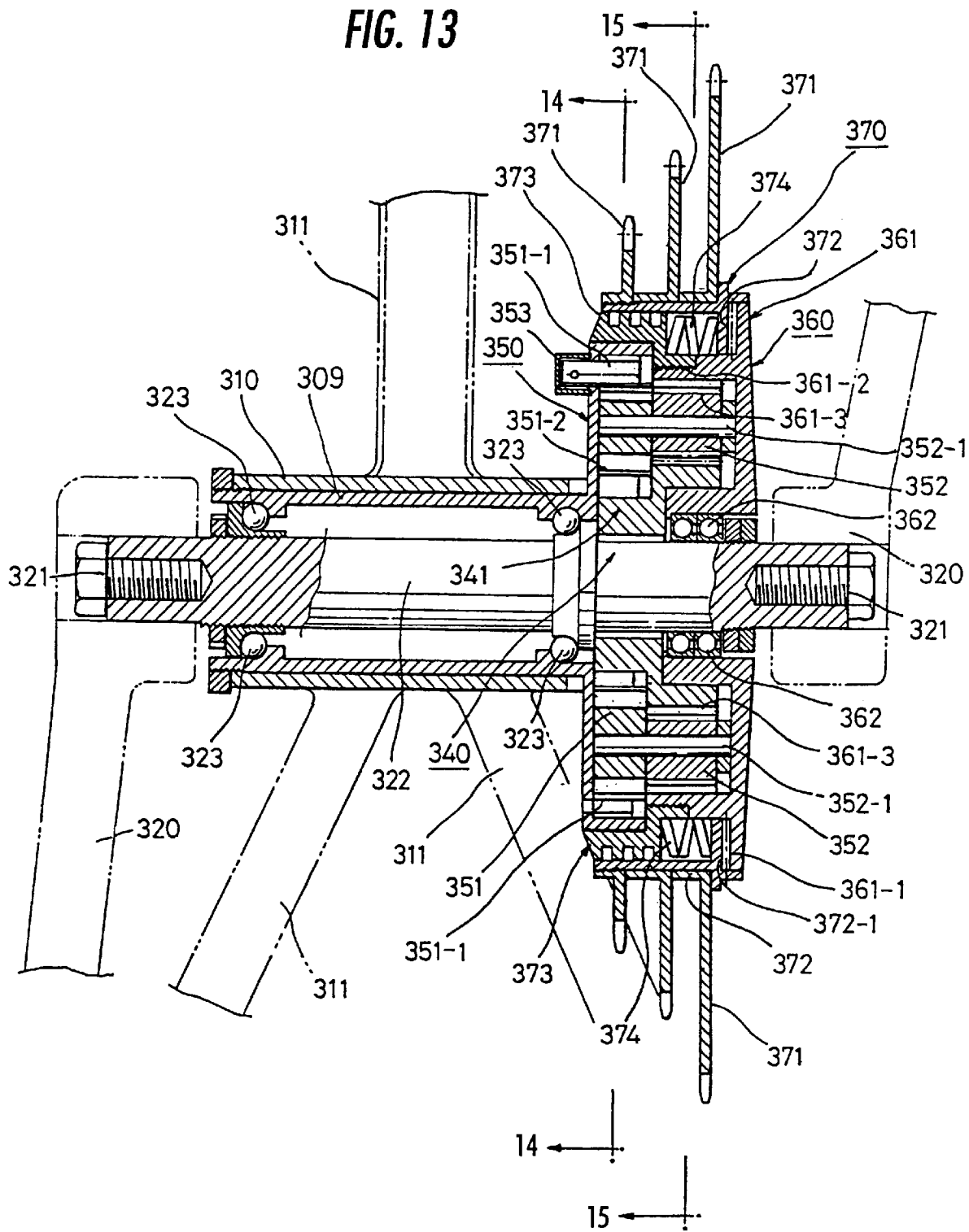
FIG. 13 is a cross-sectional view illustrating a fourth embodiment of a forward-drive apparatus for a bicycle according to the invention.

A fourth embodiment of the invention will be explained in detail as follows:

As shown in FIG. 13, according to the invention, A cartridge 309 is fitted into a pipe fixing bracket 310 to the front and rear portion of which pipe frame 311 are connected. Pedals 320 are fixed by means of a fixing screw 321 to pedal shafts 322 which are rotatably mounted in the cartridge 309 by means of bearings 323. Particularly, a forward-drive apparatus comprises a drive transferring portion 340 including the pedal 320 rotatably fixed by means of bearings 323 to the pedal shaft 322, and for transferring the drive force of the pedal 320 during the pedaling or back-pedaling to a drive sprocket; a drive switching portion 350 for converting the driving force from the drive transferring portion 340 into the forward, reverse or idle rotation of the rear wheel; a torque maintaining portion 360 rotated in a forward or idle state centering around the pedal shaft 322 according to the operation of the drive switching portion 350; and a drive coupling portion 370 elastically engaged with the torque maintaining portion 360 for transferring the drive force to a drive sprocket 371.

The drive transferring portion 340 is configured so that a drive gear 341 having two gear portions is mounted by means of splines etc. to the pedal shaft 322 to be rotated together with the pedal shaft 322 and is engaged with a ratchet wheel 351, an idle gear 352 and the drive gear 341 of the drive switching portion 350 (as described below in detail) to transfer the forward, reverse and idle rotation force to the drive switching portion 350.

Figure 14:
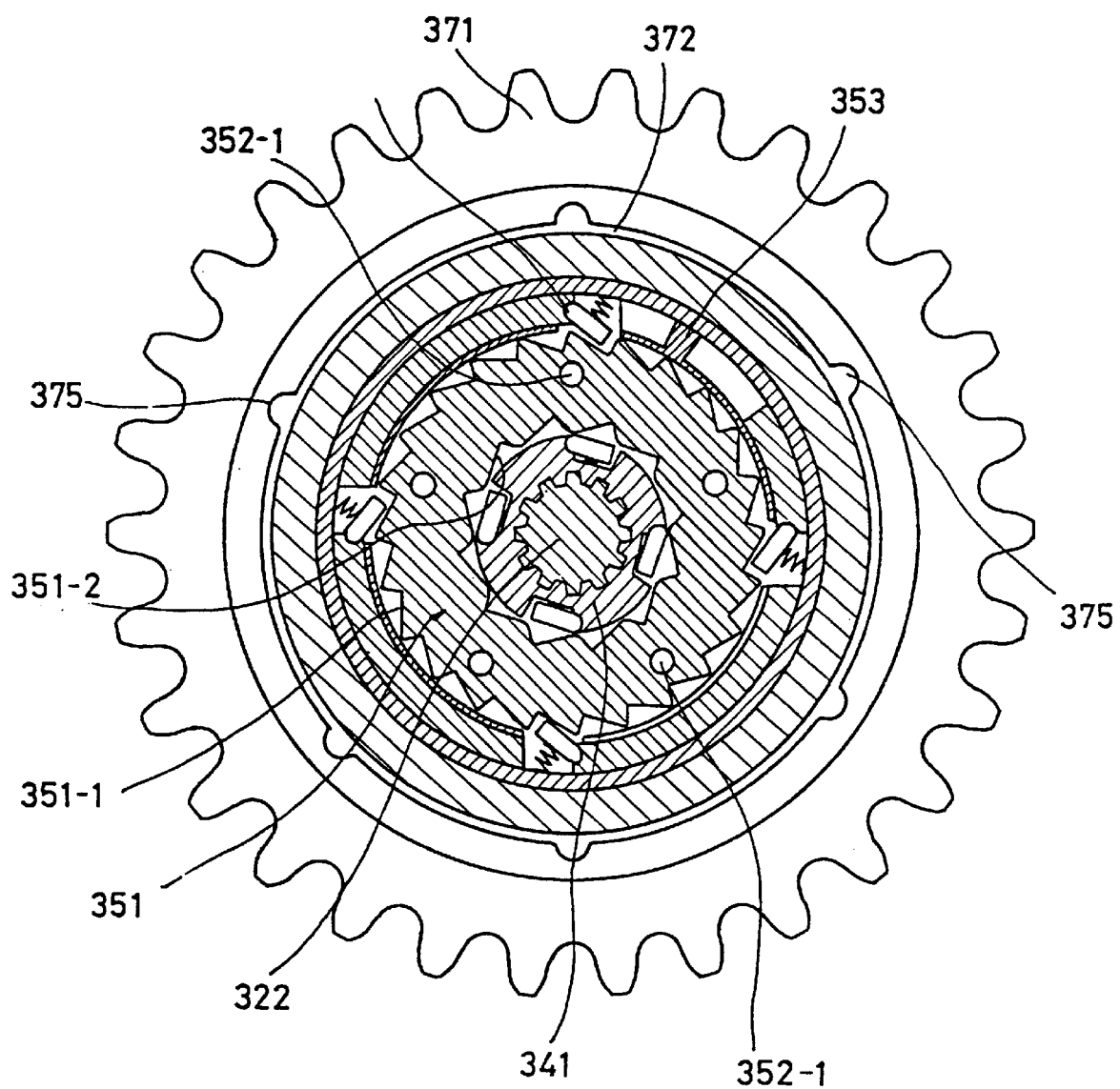
FIG. 14 is a cross-sectional view taken along line A—A of FIG. 13.

As shown in FIG. 14, the drive switching portion 350 includes a ratchet wheel 351 controlled by a switching lever 353 and idle gears 352 assembled on the shaft of the ratchet wheel 351. As described above, the ratchet wheel 351 and the idle gears 352 converts the forward or reverse rotation of the drive gear 341 of the drive transferring portion 340 to transfer the rotating force through the torque maintaining 360 to the drive coupling portion 370.

Figure 15:
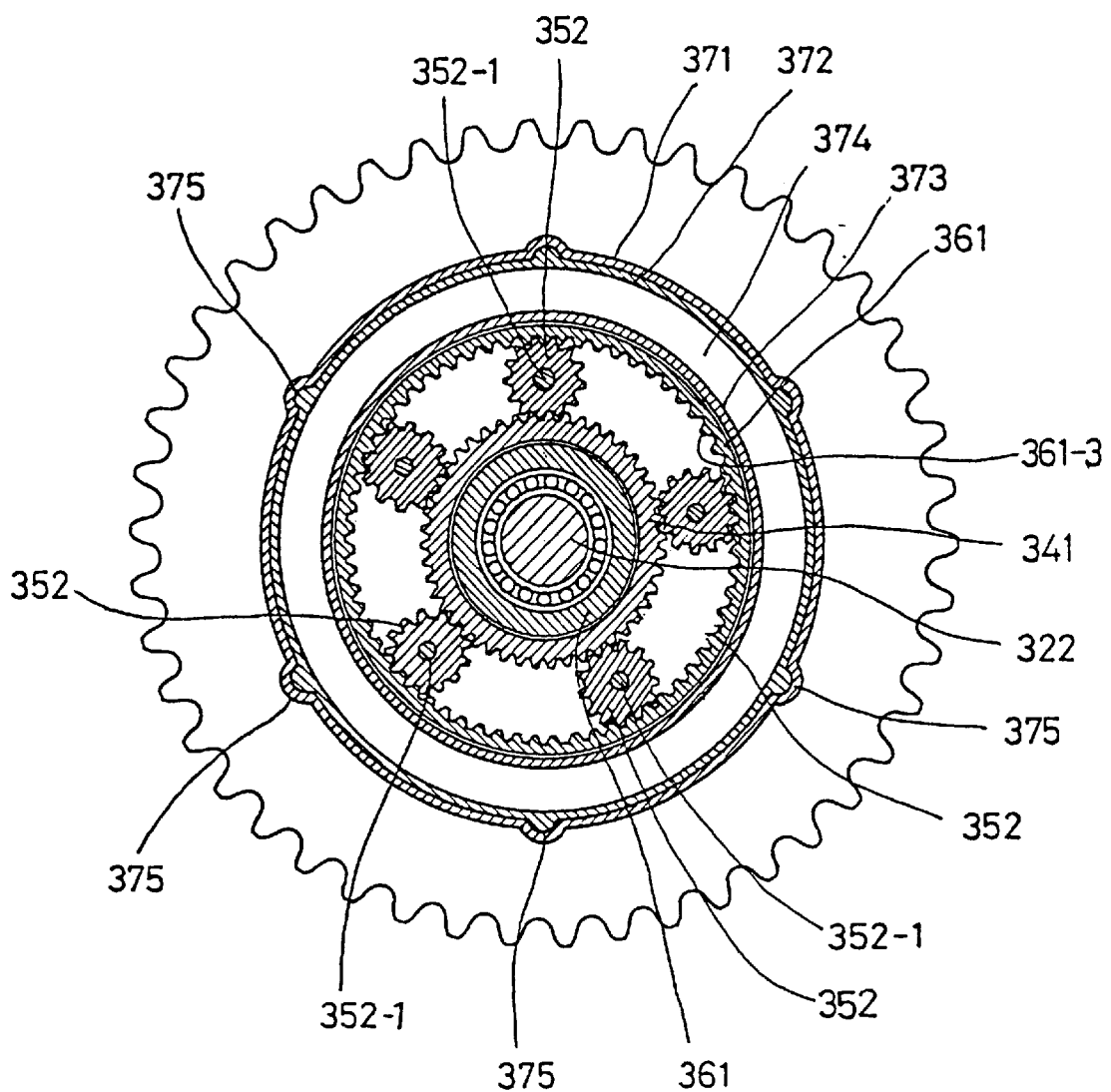
FIG. 15 is a cross-sectional view taken along line B—B of FIG. 13.

As shown in FIGS. 13 and 15, the ratchet wheel 351 includes a ratchet tooth portion 351-1 formed around the outer circumference thereof and a ratchet tooth portion 351-2 formed around the inner circumference thereof. The switching lever 353 is elastically supported in the outer ratchet tooth portion 351-1 to be operable from the outside, so that the ratchet wheel 351 is fixed or idle-rotated. Also, the drive gear 341 is mounted in the inner ratchet tooth portion 351-2 to be rotated in one-direction'by a ratchet pin, so that the ratchet wheel 351 is rotated in one direction or idle operation. The idle fixing shaft 352-1 is fixed on the side surface of the ratchet wheel 352, and the idle gears 352 are rotatably mounted on the idle fixing shafts 352-1 to be engaged with the drive gear 341. As shown in FIG. 13, the torque maintaining portion 360 is configured so that the torque maintaining wheel 361 is rotatably mounted on the pedal shaft 322 by bearings 362 and includes inner gears 361-3 formed around the inner circumference thereof to be engaged with the idle gear 352. The torque maintaining wheel 361 includes slope uneven surfaces 361-1 formed in a constant interval around the inner left and right circumference thereof and threaded portions 361-2 formed around the outer circumference thereof. The slope uneven surfaces 361-1 and the threaded portions 361-2 are elastically coupled with the drive sprocket hub 372 and the fixing wheel 373 of the drive coupling portion 370 to act to transfer the drive force of the forward, reverse and idle rotations to the drive sprocket 371.

The drive coupling portion 370 includes a drive sprocket hub 372 having a slope uneven surface 372-1 which is engaged with the torque maintaining wheel 361; a fixing wheel 373 closely coupled with the torque maintaining wheel 361 through a spring 374 between the drive sprocket hub 372 and it; and a plurality of drive sprockets 371 integrated with or separated from each another on the outer circumference of drive sprocket hub 372. The combination of the drive sprocket hub 372, the spring 374, the fixing wheel 373 and the drive sprocket 371 with the torque maintaining wheel 361 is as follows:

After the slope uneven surfaces 361-1 is engaged with the slope uneven surface 372-1, the spring 374 is mounted in the drive sprocket hub 372, and the fixing wheel 373 is coupled with the threaded portion 361-2 of the torque maintaining wheel 361. Thus, as the spring 374 is elastically shrinked, the torque maintaining wheel 361 and the drive sprocket hub 372 are closely coupled with each other, since the slope uneven surfaces 361-1 and 372-1 are engaged with each other.

As shown in FIG. 15, the drive sprocket 371 is engaged with the uneven surface 375 formed around the circumference of the drive sprocket hub 372 to be integrated with the drive sprocket hub 372. Also, multi-drive sprocket 371 can be coupled to the drive sprocket hub 372, and the drive sprocket 371 to be finally mounted is threaded to the drive sprocket hub 372 (shown in the left portion of FIG. 13).

Thus, as the pedal shaft 322 is rotated in a forward directions the drive gear 322 is forward-rotated in the same direction as the pedal shaft 322 to force the ratchet wheel 351 to be forward-rotated. As the drive gear 341 is engaged with the idle gear 352 and the idle gear 352 is engaged with the torque maintaining wheel 361, the forward rotation force of the ratchet wheel 351 is transferred to the drive sprocket 371.

Also, as the pedal shaft 322 is rotated in a reverse direction, the drive gear 322 is reverse-rotated in the same direction as the pedal shaft 322 to force the ratchet wheel 351 to be stopped by the switching lever 353. As the drive gear 341 is reverse-rotated, the drive gear 341 is engaged with the idle gear 352 to be forward-rotated.

In the case of the idle rotation of the bicycle, as the pedal 320 is reverse-rotated under the condition that the switching lever 353 is not hooked on the outer tooth portion 351-1 of the ratchet wheel 351, the ratchet wheel 351 is freely rotatable. The idle gear 352 rotatable at the idle fixing axis 352-1 of the ratchet wheel 351 is engaged with the drive gear 341, thereby losing its control force. At that time, the drive gear 341 is reverse-rotated, the idle gear 352 is idle-rotated in a forward direction. Due to it, the rotation force is not transferred to the idle gear 352 and the inner gear 361-3 of the torque maintaining wheel 361 as well as to the drive sprocket 371 of the drive sprocket hub 372 coupled with the torque maintaining wheel 361. Thus, even if the pedal 320 is reverse-rotated, the drive force is not transferred to the driven sprocket of the rear wheel, and also during walking the bicycle the pedal 320 is maintained in a standstill state.

The acting-effects of the fourth embodiment according to the invention will be as follows:

Firstly, as the pedal 320 is worked in a forward direction, the drive gear 341 fixed to the pedal shaft 322 is rotated in a forward direction. Herein, it is noted from FIG. 14 that the drive gear 341 rotates the tooth portion 351-2 of the ratchet wheel 351 in a forward direction, because the switching lever 353 is not hooked up on the tooth portion 351-1 of the ratchet wheel 351 with respect to the forward-rotation of the ratchet wheel 351. Also, the idle gear 352 is engaged with the drive gear 341 following by the inner gear 361-3 of the torque maintaining wheel 352 to be maintained in a standstill state. For it, the forward driving force of the pedal 320 (the forward rotating force of the ratchet wheel 351) does not rotate the idle gear 352, but rotates the torque maintaining wheel 361, so that the drive sprocket 371 is rotated in a forward direction. Therefore, as the drive sprocket 371 is forward-rotated, the driven sprocket coupled through the chain to the drive sprocket 371 is rotated to operate the rear wheel in a forward direction, thereby working the bicycle in a forward movement.

On the other hand, when the pedal 320 is worked in a reverse rotation under the condition that the switching lever 353 is hooked on the ratchet tooth portion 353-2 of the ratchet wheel 351, the drive gear 341 fixed to the pedal shaft 322 is rotated in a reverse direction. But, as the drive gear 341 is reverse-rotated under the condition that the idle gear 352 is engaged with the drive gear 341, the idle gear 352 is forward-rotated and then the drive sprocket 371 is forward-rotated, since the idle gear 352 and the inner gear 361-3 are engaged with each other. Therefore, as if the pedal 320 is forward-rotated, the drive sprocket 371 is forward-rotated to operate the driven sprocket coupled through the chain thereto. The driven sprocket rotates the rear wheel in a forward direction to work the bicycle in a forward movement.

Additionally, the invention absorbs the impact to prevent it from being transferred to the drive transferring portion 340 and the drive switching portion 350, even if the terrible impact is applied to the drive sprocket 371. Because the torque maintaining wheel 361 and the drive sprocket hub 372 are elastically coupled with each other in a face to face arrangement of their slope uneven surfaces 361-1 and 371-1 with the spring 374 being supported.

As described above, according to the invention, the bicycle is traveled in a forward movement during the pedaling or back-pedaling based on the lever selection of users, but it is maintained in an idle state like a conventional bicycle as well. It offers users the wide range of the traveling selection and relieves the user's fatigue feeling even during the long time of traveling.

Figure 16:
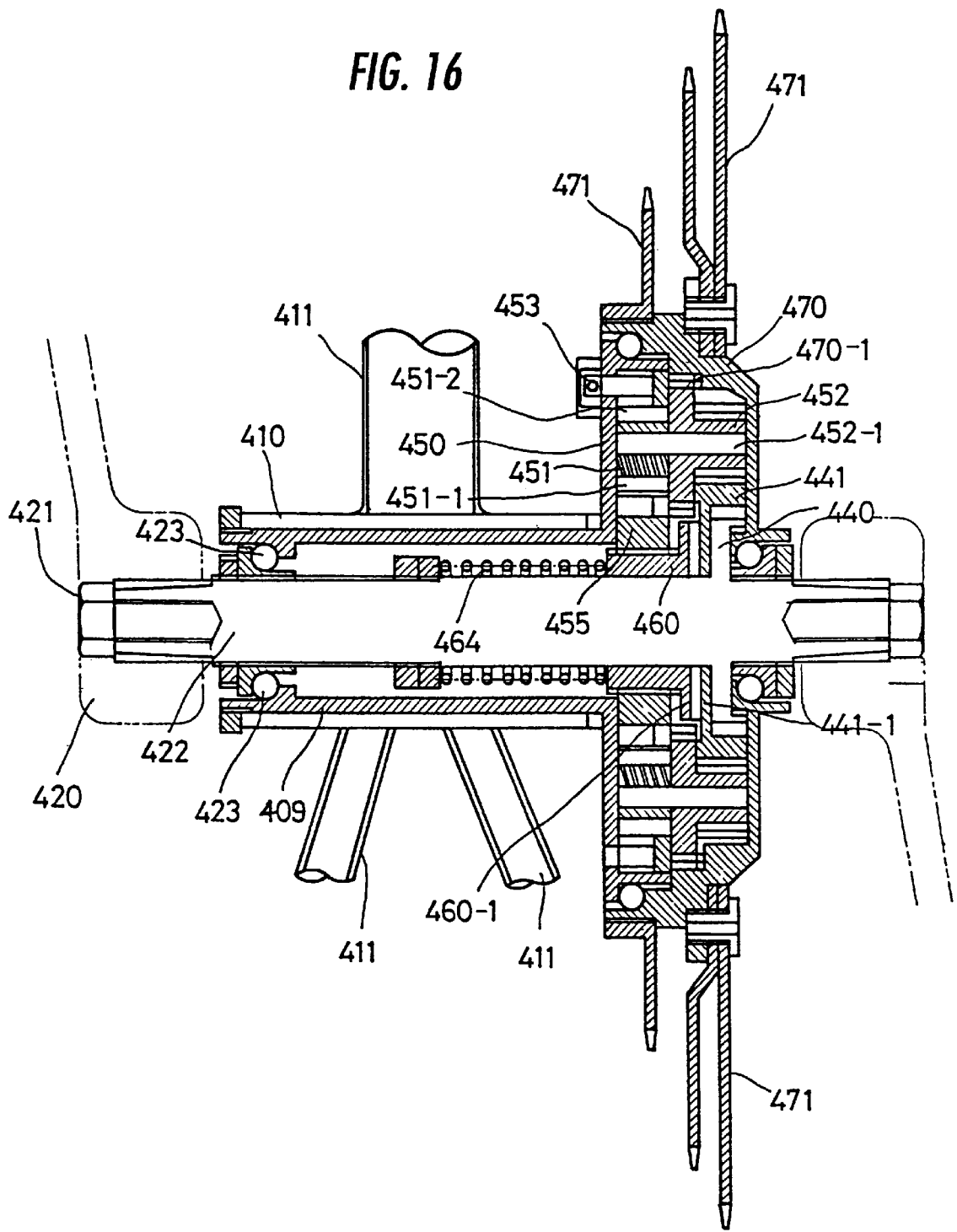
FIG. 16 is a cross-sectional view illustrating a fifth embodiment of a forward-drive apparatus for a bicycle according to the invention.
Figure 17:
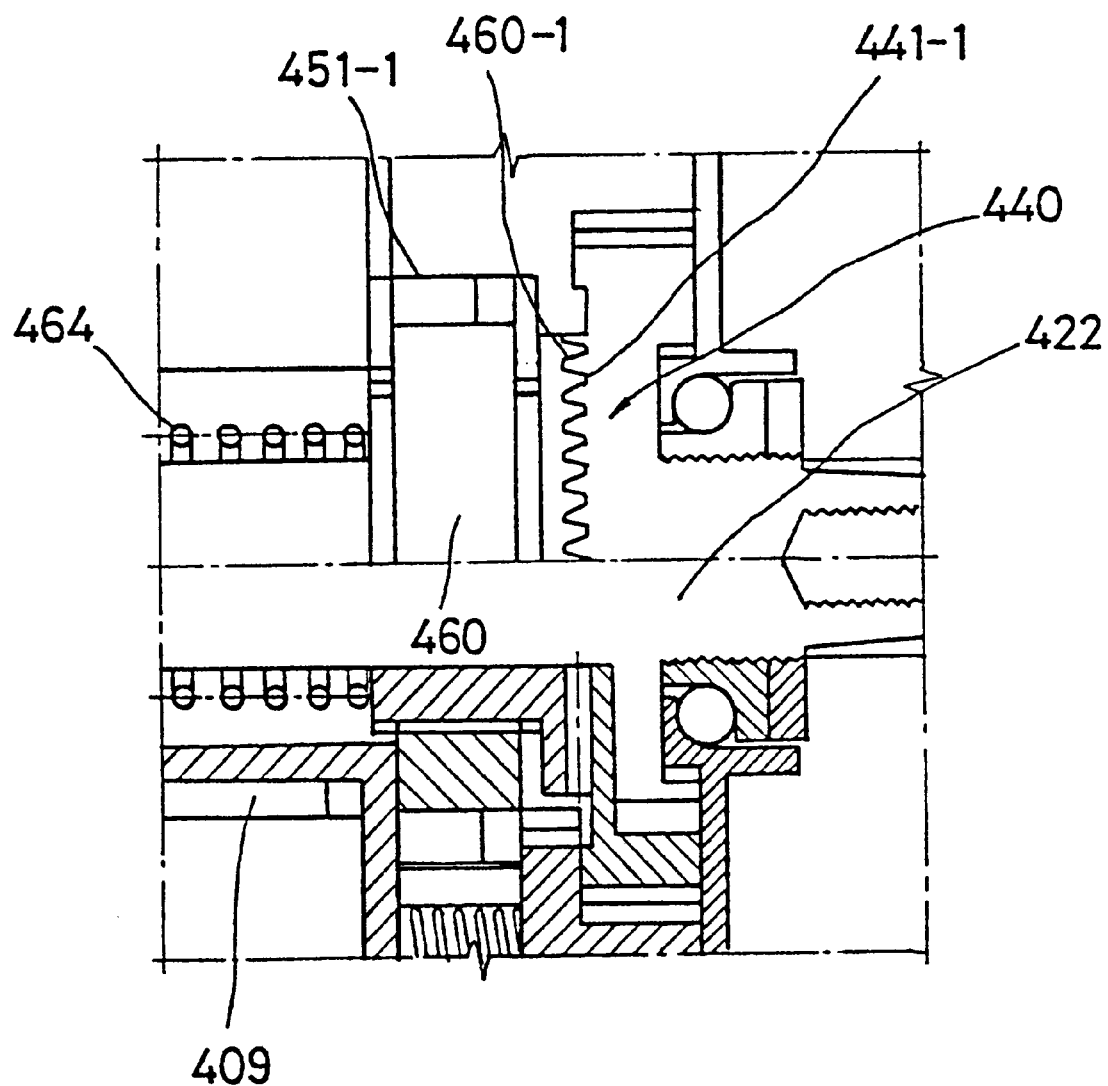
FIG. 17 is an enlarged cross-sectional view illustrating the important portion of FIG. 16.

A fifth embodiment of the invention will be explained in detail as follows:

As shown in FIG. 16, according to the invention, A cartridge 409 is fitted into a pipe fixing bracket 410 to the front and rear portions of which pipe frame 411 are connected. Pedals 420 are fixed by means of a fixing screw 421 to pedal shafts 422 which are rotatably mounted in the cartridge 409 by means of bearings 423. Particularly, a forward-drive apparatus comprises a drive transferring portion 440 including the pedal 420 rotatably fixed by means of bearings 423 to the pedal shaft 422, and for transferring the drive force of the pedal 420 during the pedaling or back-pedaling to a drive sprocket; a torque maintaining portion 460 elastically engaged with the drive transferring portion 440; a drive switching portion 450 for converting the driving force from the torque maintaining portion 460 into the forward, reverse or idle rotation of the rear wheel; and a drive coupling portion 470 for rotating the drive sprocket 471 in a forward or idle state by the switched drive force of the drive switching portion 450.

The drive transferring portion 440 is configured so that a drive gear 441 having two gear portions is mounted by means of splines etc. to the pedal shaft 422 to be rotated together with the pedal shaft 322 and is engaged with an idle gear 452 following by the torque maintaining portion 460 (as described below in detail) to transfer the forward, reverse and idle rotation force to the torque maintaining portion 460. The torque maintaining portion 460 transfers the drive force from the drive transferring portion 440 to a first ratchet wheel 455 which is coupled by means of splines etc. thereto.

The drive switching portion 450 includes a second ratchet wheel 451 controlled by a switching lever 453 and idle gears 452 assembled on the shaft of the second ratchet wheel 451. The second ratchet wheel 451 and the idle gears 452 converts the forward or reverse rotation of the drive gear 441 of the drive transferring portion 440 to transfer the rotating force to the drive coupling portion 470.

The second ratchet wheel 451 includes a ratchet tooth portion 451-1 formed around the outer circumference thereof and a ratchet tooth portion 451-2 formed around the inner circumference thereof The switching lever 453 is elastically supported in the ratchet tooth portion 451-1 to be operable from the outside, so that the second ratchet wheel 451 is fixed or idle-rotated. Also, the ratchet tooth portion 451-2 enables the first ratchet wheel 455 to be rotated in one direction or idle state. The one-direction rotation of the ratchet tooth portion 451-2 rotates the second ratchet wheel 451. The idle fixing shaft 452-1 is fixed on the side surface of the second ratchet wheel 451, and the idle gears 452 are rotatably mounted on the idle fixing shafts 452-1 to be engaged with the drive gear 441.

The torque maintaining portion 460 is coupled by means of splines etc. to the first ratchet 455 and includes slope uneven surfaces 460-1 formed in a constant interval around the left and right side circumferences thereof to engage with the drive gear 441. The slope uneven surfaces 460-1 are elastically engaged with the first ratchet wheel 455 to transfer the drive force of the forward, reverse and idle rotations to the first ratchet wheel 455. Also, as the spring 464 is elastically shrinked, the torque maintaining portion 460 and the drive gear 441 are closely coupled with each other, since the slope uneven surfaces 441-1 and 460-1 are engaged with each other.

The drive coupling portion 470 is configured to engage with the idle gear 452 and includes a plurality drive sprockets 471 formed around the outer circumference thereof to be integrated with separated from each another.

Thus, as the pedal shaft 422 is rotated in a forward direction, the drive gear 422 is forward-rotated in the same direction as the pedal shaft 422 to force the second ratchet wheel 451 to be forward-rotated. As the drive gear 441 is engaged with the idle gear 452 and the idle gear 452 is engaged with the drive coupling wheel 470, the forward rotation force of the ratchet wheel 451 is transferred to the drive sprocket 471.

Also, as the pedal shaft 422 is rotated in a reverse direction, the drive gear 441 is reverse-rotated in the same direction as the pedal shaft 422. At that time, the toque maintaining portion 460 is elastically engaged with the drive gear 441 by the switching lever 422 to be reverse-rotated, and the first ratchet wheel 455 is coupled by means of splines with the torque maintaining portion 460 to be reverse-rotated, so that the switching lever 453 is passed over the ratchet tooth portion 451-1. Thus, the first ratchet wheel 455 is stopped. As the drive gear 441 is reverse-rotated, it is engaged with the idle gear 452 to be forward-rotated.

In the case of the idle rotation of the bicycle, as the pedal 420 is reverse-rotated under the condition that the switching lever 453 is not hooked on the outer tooth portion 451-1 of the second ratchet wheel 451, the second ratchet wheel 451 is freely rotatable. The idle gear 452 rotatable at the idle fixing axis 452-1 of the second ratchet wheel 451 is engaged with the drive gear 441, thereby losing its control force. At that time, the drive gear 441 is reverse-rotated, the idle gear 452 is idle-rotated in a forward direction. Due to it, the rotation force is not transferred to the idle gear 452 and the drive coupling portion 470 as well as to the drive sprocket 471. Thus, even if the pedal 420 is reverse-rotated, the drive force is not transferred to the driven sprocket of the rear wheel, and also during walking the bicycle the pedal 420 is maintained in a standstill state.

The acting-effects of the fifth embodiment according to the invention will be as follows:

Firstly, as the pedal 420 is worked in a forward direction, the drive gear 441 fixed to the pedal shaft 422 is rotated in a forward direction. Herein, it is noted that the drive gear 441 rotates the ratchet tooth portion 451-2 of the second ratchet wheel 451 in a forward direction, because the switching lever 453 is not hooked up on the ratchet tooth portion 451-2 of the second ratchet wheel 451 with respect to the forward-rotation of the second ratchet wheel 451. Also, the idle gear 452 is engaged with the drive gear 441 following by the inner gear 470-1 of the drive coupling portion 470 to be maintained in a standstill state. For it, the forward driving force of the pedal 420 (the forward rotating force of the second ratchet wheel 451) does not rotate the idle gear 452, but rotates the drive coupling portion 470, so that the drive sprocket 471 is rotated in a forward direction. Therefore, as the drive sprocket 471 is forward-rotated, the driven sprocket coupled through the chain to the drive sprocket 471 is rotated to operate the rear wheel in a forward direction, thereby working the bicycle in a forward movement.

On the other hand, when the pedal 420 is worked in a reverse rotation under the condition that the switching lever 453 is hooked on the ratchet tooth portion 451-2 of the second ratchet wheel 451, the drive gear 441 fixed to the pedal shaft 422 is rotated in a reverse direction. The ratchet tooth portion 451-2 of the second ratchet wheel 451 is reverse-rotated to cause the switching lever 453 to be hooked thereon, thereby maintaining the second ratchet wheel 451 in a standstill state But, as the drive gear 441 is reverse-rotated under the condition that the idle gear 452 is engaged with the drive gear 441, the idle gear 452 is forward-rotated and then the drive sprocket 471 is forward-rotated, since the idle gear 452 and the drive gear 441 are engaged with each other. Therefore, as if the pedal 420 is forward-rotated, the drive sprocket 471 is forward-rotated to work the bicycle in a forward movement.

Additionally the invention absorbs the impact to prevent it from being transferred to the drive switching portion 450, even if the terrible impact is applied to the bicycle. Because the torque maintaining portion 460 and the drive gear 441 are elastically coupled with each other in a face to face arrangement of their slope uneven surfaces 441-1 and 460-1 with the spring 464 being supported.

As described above, according to the invention, the bicycle is traveled in a forward movement during the pedaling or back-pedaling based on the lever selection of users, but it is maintained in an idle state like a conventional bicycle as well. It offers users the wide range of the traveling selection and relieves the user's fatigue feeling even during the long time of traveling.

Figure 18:
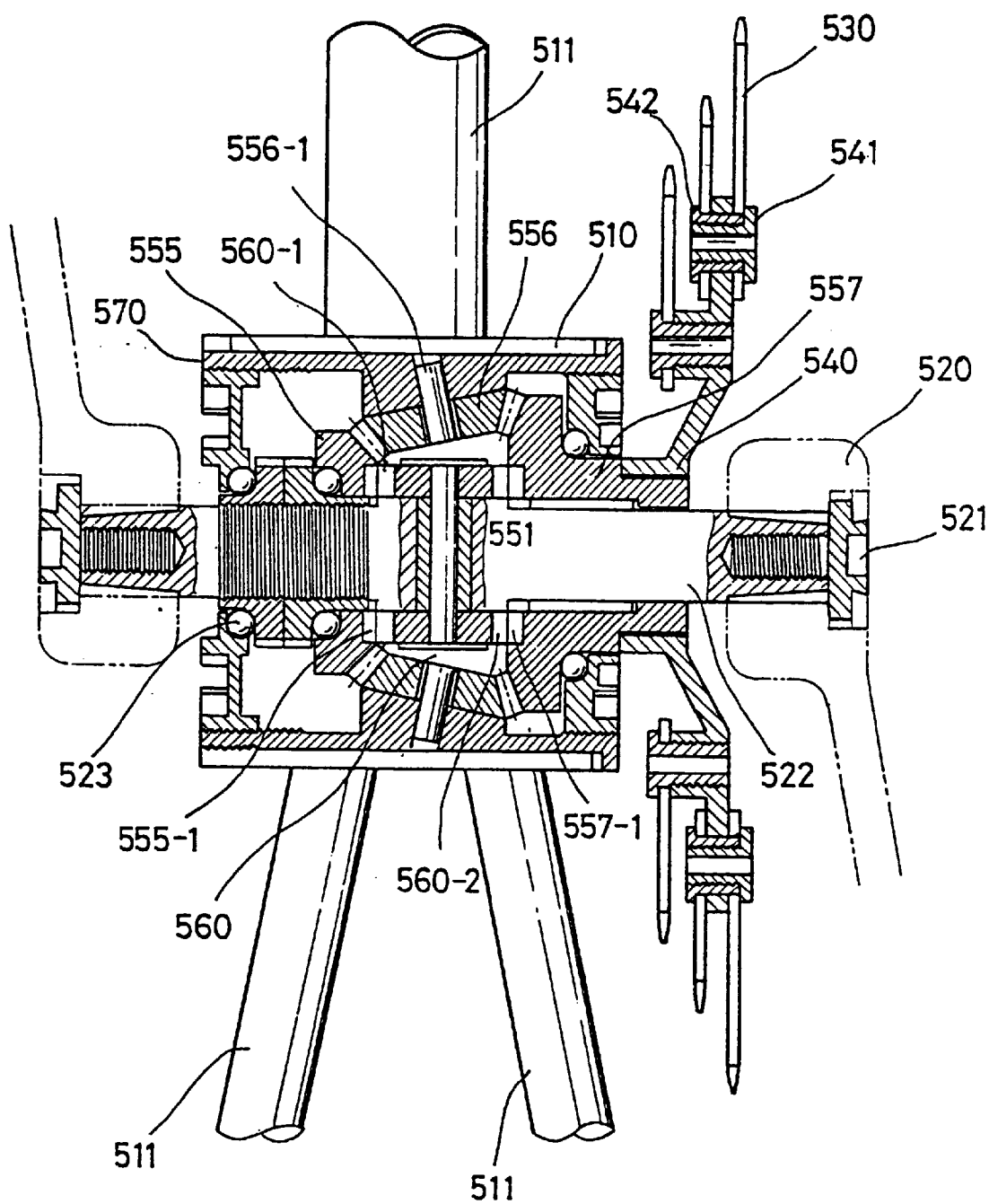
FIG. 18 is a cross-sectional view illustrating a sixth embodiment of a forward-drive apparatus for a bicycle according to the invention.
Figure 19:
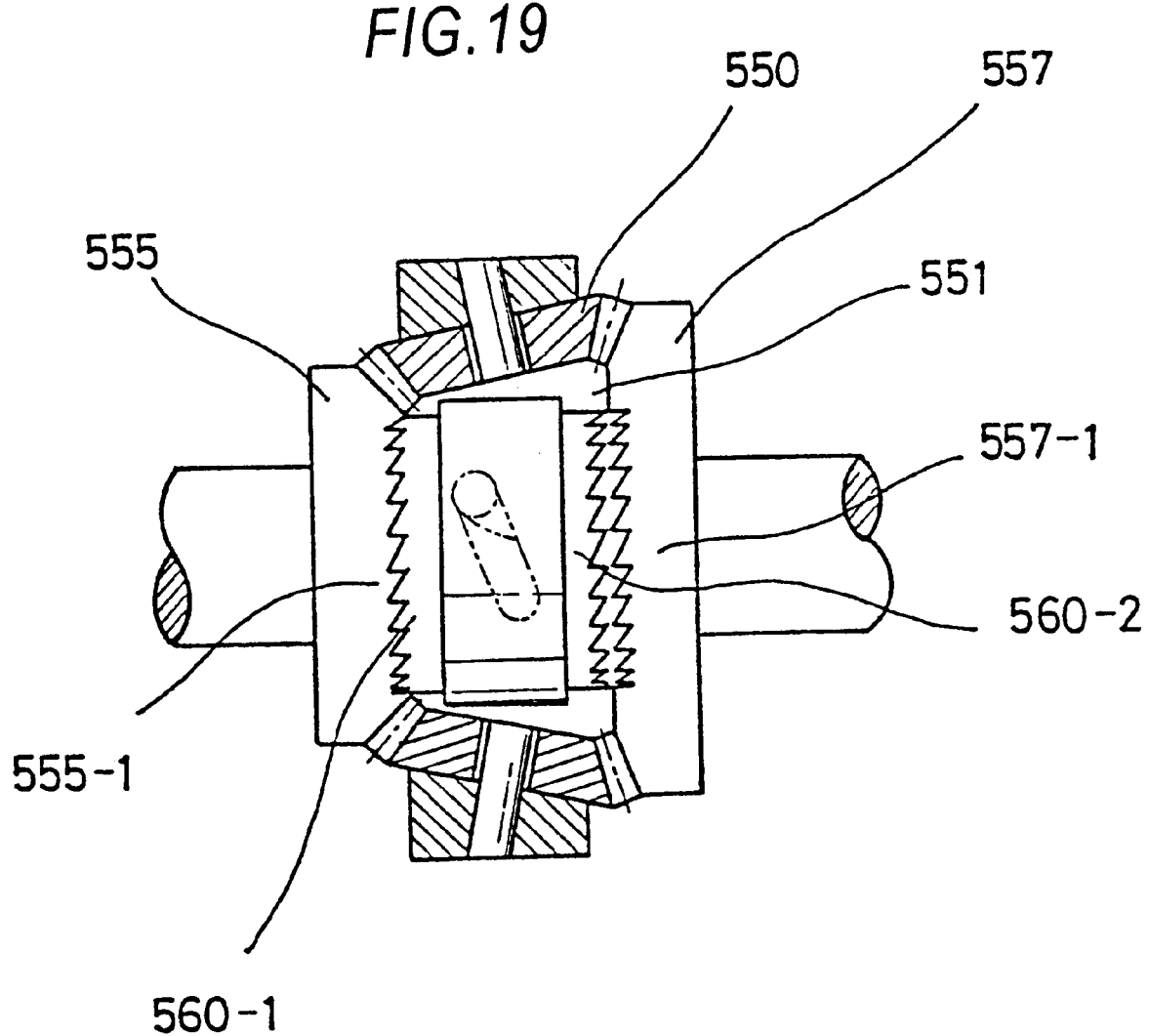
FIG. 19 is an enlarged cross-sectional view illustrating the important portion of FIG. 18.

A sixth embodiment of the invention will be explained in detail as follows:

As shown in FIG. 18, according to the invention, a forward-drive apparatus for a bicycle comprises a drive transferring portion 551 including a fixing cylinder 570 fitted into a pipe fixing bracket 510, to the front and rear portions of which pipe frame 511 are connected, and pedals 520 fixed by means of a fixing screw 521 to pedal shafts 522 which are rotatably mounted thereto by means of bearings 523, and for transferring the drive force of the pedal 520 during the pedaling or back-pedaling to a drive switching portion moved along a groove which is formed on the pedal shaft 522. A drive switching portion 560 is configured to transfer the drive force from the drive transferring portion 551 to a first bevel gear 555 or a third bevel gear 557 mounted on the circumference thereof, thereby transferring the forward or reverse rotating force converted by the gears to a drive sprocket 530. A drive coupling portion 540 is configured to transfer the switched drive force generated by the first bevel gear 555, a second bevel gear 556 and the third bevel gear 557 to the drive sprocket 530.

The drive coupling portion 540 is coupled by means of screws to the third bevel gear 557 to be integrally rotated together.

The drive sprocket 530 is integrated with the drive coupling portion 540 by means of a bolt 541 and a nut 542, thereby transferring the switched drive force through a chain to a driven sprocket (not shown).

The drive transferring portion 551 is mounted on the pedal shaft 522 to be reciprocated. At the time of the forward or reverse rotating of the pedal 520, tooth portions 560-1 and 560-2 formed an both surfaces of the drive transferring portion 551 are engaged with each other to transfer the drive force to the drive switching portion 560.

The drive switching portion 560 is engaged with the tooth portions 555-1 and 557-1 formed on the side surface of each of the first bevel gear 555 and the third bevel gear 557 to transfer the drive force from the drive transferring portion 551 to the drive coupling portion 540.

Thus, as the pedal shaft 522 is rotated in a forward direction, the drive transferring portion 551 is moved in a right direction as shown in FIG. 18. At that time, it is engaged with the third bevel gear 557 to transfer the drive force to the drive coupling portion 540.

Also, as the pedal shaft 522 is rotated in a reverse direction, the drive transferring portion 551 is moved in a left direction as shown in FIG. 18. At that time, it is engaged with the first bevel gear 555 to be reverse-rotated. Then, the first bevel gear 555 is engaged with the second bevel gear 556 to be forward-rotated. And the second bevel gear 556 is engaged with the third bevel gear 557 to be forward-rotated. Herein, the second bevel gear 556 is rotatably mounted in the fixing cylinder 570 by the fixing pin 556-1.

The acting-effects of the sixth embodiment according to the invention will be as follows:

Firstly, as the pedal 520 is worked in a forward direction, the drive transferring portion 551 is moved rightward on the pedal shaft 522. At that time, as the tooth portion 555-1 of the first bevel gear 555 and the tooth portion 557-1 of the third bevel gear 557 are engaged with each other to be forward-rotated, thereby rotating the drive coupling portion 540 coupled by means of screws to the third bevel gear 557 in a forward direction. Then, the second bevel gear 556 is engaged with the third bevel gear 557 to be reverse-rotated The first bevel gear 555 is engaged with the second bevel gear 556 to be slidably forward-rotated. Therefore, as the drive coupling portion 540 is forward-rotated, the driven sprocket coupled through the chain to the drive sprocket 530 is rotated to operate the rear wheel in a forward direction, thereby working the bicycle in a forward movement.

On the other hand, as the pedal shaft 522 is rotated in a reverse direction, the drive transferring portion 551 is moved in a left direction along the groove formed on the pedal shaft 522. At that time, it is engaged with the first bevel gear 555 to be reverse-rotated. Then, the second bevel gear 556 is engaged with the first bevel gear 555 to be forward-rotated. And the third bevel gear 557 is engaged with the second bevel gear 556 to be forward-rotated, while the drive coupling portion 540 threaded to the third bevel gear 557 is forward-rotated together with the drive sprocket 530. Therefore, as if the pedal 520 is rotated in a forward direction, the driven sprocket coupled through the chain to the drive sprocket 530 is rotated to operate the rear wheel in a forward direction, thereby working the bicycle in a forward movement. Also, during the traveling the bicycle can be kept in an idle rotation without working the pedal.

What is claimed is:

1. A forward-drive apparatus for a bicycle comprising:
a drive transferring portion (220) having a rotating wheel (222) rotatable mounted to a rear shaft (211), said rotating wheel (222) being rotatable forward and backward together with a driven sprocket (221);
a drive switching portion (230) having a ratchet cylinder (231) rotatable mounted at an outer circumference of the rotating wheel (222) for switching a driving force transferred from the drive transferring portion (220) through idle gears (241) and the ratchet cylinder (231) into a force for forward traveling, idling or stopping of a rear wheel; and a drive coupling portion (240) for transferring a forward rotation or idling force to a hub (212) of the rear wheel according to the switching operation of the drive switching portion (230) wherein the rotating wheel (222) includes a one-direction fixing stopper (223) engageable with the ratchet cylinder (231) and a plain gear (224) to be engaged with the drive coupling portion (240).

2. The forward-drive apparatus for a bicycle as claimed in claim 1, further comprising stopper wheel (234) mounted to the rear shaft (211) to be coupled with or separated from the ratchet cylinder (231), thereby fixing or rotating forward the ratchet cylinder (231).

3. A forward-drive apparatus for a bicycle comprising:

a drive transferring portion (220) having a rotating wheel (222) rotatable mounted to a rear shaft (211), said rotating wheel (222) being rotatable forward and backward together with a driven sprocket (221);

a drive switching portion (230) having a ratchet cylinder (231) rotatably mounted at an outer circumference of the rotating wheel (222) for switching a driving force transferred from the drive transferring portion (220) through idle gears (241) and the ratchet cylinder (231) into a force for forward traveling, idling or stopping of a rear wheel; and a drive coupling portion (240) for transferring a forward rotation or idling force to a hub (212) of the rear wheel according to the switching operation of the drive switching portion (230) wherein said idle gears (241) are rotatably formed on at least one fixing shaft (244) and are engaged with a plain gear (224) of the drive transferring portion (220) and with an inner gear (260) formed at the hub (212) of the rear wheel, thereby rotating forward or idling the hub (212).

4. A forward-drive apparatus for a bicycle comprising:

a drive transferring portion (220) having a rotating wheel (222) rotatably mounted to a rear shaft (211), said rotating wheel (222) being rotatable forward and backward together with a driven sprocket (221);

a drive switching portion (230) having a ratchet cylinder (231) rotatable mounted at an outer circumference of the rotating wheel (222) for switching a driving force transferred from the drive transferring portion (220) through idle gears (241) and the ratchet cylinder (231) into a force for forward traveling, idling or stopping of a rear wheel; and a drive coupling portion (240) for transferring a forward rotation or idling force to a hub (212) of the rear wheel according to the switching operation of the drive switching portion (230) wherein the ratchet cylinder (231) includes a stopper wheel (234), fixed to the rear shaft (211), which has an elastic stopper (234-2) being elastically movable centering around a hinge shaft (234-1) through a moving cylinder (250), said elastic stopper (234-2) being coupled with or separated from a ratchet tooth (243) of the ratchet cylinder (231), thereby fixing or rotating forward the ratchet cylinder (231) against the driving force of the driven sprocket (221).

* * * * *

UNITED STATES PATENT AND TRADEMARK OFFICE
CERTIFICATE OF CORRECTION

PATENT NO. : 5,904,362
DATED : May 18, 1999
INVENTOR(S) : Mun-Su YOO

It is certified that error appears in the above-indentified patent and that said Letters Patent is hereby corrected as shown below:

On the title page, item [30], please change "June 14, 1995" to --June 14, 1994--

Signed and Sealed this

Twelfth Day of September, 2000

Attest:

Q. TODD DICKINSON

*Attesting Officer*   *Director of Patents and Trademarks*